(12) United States Patent
Coteus et al.

(10) Patent No.: US 8,145,868 B2
(45) Date of Patent: Mar. 27, 2012

(54) METHOD AND SYSTEM FOR PROVIDING FRAME START INDICATION IN A MEMORY SYSTEM HAVING INDETERMINATE READ DATA LATENCY

(75) Inventors: Paul W. Coteus, Yorktown Heights, NY (US); Kevin C. Gower, LaGrangeville, NY (US); Warren E. Maule, Cedar Park, NY (US); Robert B. Tremaine, Stormville, NY (US)

(73) Assignee: International Business Machines Corporation, Armonk, NY (US)

( * ) Notice: Subject to any disclaimer, the term of this patent is extended or adjusted under 35 U.S.C. 154(b) by 658 days.

(21) Appl. No.: 11/843,150

(22) Filed: Aug. 22, 2007

(65) Prior Publication Data

US 2007/0286078 A1 Dec. 13, 2007

Related U.S. Application Data

(63) Continuation-in-part of application No. 11/289,193, filed on Nov. 28, 2005, now Pat. No. 7,685,392.

(51) Int. Cl.
*G06F 12/00* (2006.01)
(52) U.S. Cl. .................. 711/167; 711/170; 711/163
(58) Field of Classification Search .................. 711/167, 711/163, 170
See application file for complete search history.

(56) References Cited

U.S. PATENT DOCUMENTS

| | | | |
|---|---|---|---|
| 2,842,682 A | 7/1958 | Clapper | |
| 3,333,253 A | 7/1967 | Sahulka | |
| 3,395,400 A | 7/1968 | De Witt | |
| 3,825,904 A | 7/1974 | Burk et al. ................. 340/172.5 |
| 4,028,675 A | 6/1977 | Frankenberg ................. 711/106 |
| 4,135,240 A | 1/1979 | Ritchie | |
| 4,150,428 A | 4/1979 | Inrig et al. | |
| 4,472,780 A | 9/1984 | Chenoweth et al. | |
| 4,475,194 A | 10/1984 | LaVallee et al. ................. 371/10 |
| 4,479,214 A | 10/1984 | Ryan | |
| 4,486,739 A | 12/1984 | Franaszek et al. ............ 340/347 |
| 4,641,263 A | 2/1987 | Perlman et al. | |
| 4,654,857 A | 3/1987 | Samson et al. .................. 371/68 |
| 4,723,120 A | 2/1988 | Petty, Jr. .................. 340/825.02 |
| 4,740,916 A | 4/1988 | Martin .......................... 364/900 |

(Continued)

FOREIGN PATENT DOCUMENTS

EP          0229316 A2    7/1987

(Continued)

OTHER PUBLICATIONS

Yang, Q.; Bhuyan, L.N., "Analysis of packet-switched multiple-bus multiprocessor systems," Computers, IEEE Transactions on, vol. 40, No. 3, pp. 352-357, Mar. 1991.

(Continued)

*Primary Examiner* — Yong Choe
(74) *Attorney, Agent, or Firm* — Cantor Colburn LLP

(57) ABSTRACT

A method and system for providing frame start indication in a memory system having indeterminate read data latency. The method includes receiving a data transfer and determining if the data transfer includes a frame start indicator. The method also includes capturing the data transfer and "n" subsequent data transfers in response to determining that the data transfer includes a frame start indicator. The data transfer and the "n" subsequent data transfers comprise a data frame.

8 Claims, 9 Drawing Sheets

U.S. PATENT DOCUMENTS

| | | | |
|---|---|---|---|
| 4,782,487 A | 11/1988 | Smelser | |
| 4,796,231 A | 1/1989 | Pinkham | 365/189.05 |
| 4,803,485 A | 2/1989 | Rypinski | 370/452 |
| 4,833,605 A | 5/1989 | Terada et al. | 364/200 |
| 4,839,534 A | 6/1989 | Clasen | 307/269 |
| 4,943,984 A | 7/1990 | Pechanek et al. | 375/109 |
| 4,964,129 A | 10/1990 | Bowden, III et al. | |
| 4,964,130 A | 10/1990 | Bowden, III et al. | |
| 4,985,828 A | 1/1991 | Shimizu et al. | 364/200 |
| 5,053,947 A | 10/1991 | Heibel et al. | 364/200 |
| 5,177,375 A | 1/1993 | Ogawa et al. | |
| 5,206,946 A | 4/1993 | Brunk | 710/2 |
| 5,214,747 A | 5/1993 | Cok | 395/27 |
| 5,265,212 A | 11/1993 | Bruce, II | 710/113 |
| 5,287,531 A | 2/1994 | Rogers, Jr. et al. | 395/800 |
| 5,347,270 A | 9/1994 | Matsuda et al. | 340/2.21 |
| 5,357,621 A | 10/1994 | Cox | |
| 5,375,127 A | 12/1994 | Leak | |
| 5,387,911 A | 2/1995 | Gleichert et al. | 341/95 |
| 5,394,535 A | 2/1995 | Ohuchi | 711/155 |
| 5,410,545 A | 4/1995 | Porter et al. | |
| 5,454,091 A | 9/1995 | Sites et al. | 395/413 |
| 5,475,690 A | 12/1995 | Burns et al. | 370/105.3 |
| 5,513,135 A | 4/1996 | Dell et al. | 365/52 |
| 5,517,626 A | 5/1996 | Archer et al. | |
| 5,522,064 A | 5/1996 | Aldereguia et al. | |
| 5,544,309 A | 8/1996 | Chang et al. | 395/183.06 |
| 5,546,023 A | 8/1996 | Borkar et al. | |
| 5,561,826 A | 10/1996 | Davies et al. | |
| 5,592,632 A | 1/1997 | Leung et al. | 395/306 |
| 5,594,925 A | 1/1997 | Harder et al. | |
| 5,611,055 A | 3/1997 | Krishan et al. | 395/281 |
| 5,613,077 A | 3/1997 | Leung et al. | 395/306 |
| 5,627,963 A | 5/1997 | Gabillard et al. | 714/42 |
| 5,629,685 A | 5/1997 | Allen et al. | 340/825.02 |
| 5,661,677 A | 8/1997 | Rondeau, II et al. | 365/63 |
| 5,666,480 A | 9/1997 | Leung et al. | 395/180 |
| 5,684,418 A | 11/1997 | Yanagiuchi | |
| 5,706,346 A | 1/1998 | Katta et al. | |
| 5,737,589 A | 4/1998 | Doi et al. | |
| 5,754,804 A | 5/1998 | Cheselka et al. | |
| 5,764,155 A | 6/1998 | Kertesz et al. | 340/825.08 |
| 5,822,749 A | 10/1998 | Agarwal | 707/2 |
| 5,852,617 A | 12/1998 | Mote, Jr. | 714/726 |
| 5,870,320 A | 2/1999 | Volkonsky | |
| 5,870,325 A | 2/1999 | Nielsen et al. | 365/63 |
| 5,872,996 A | 2/1999 | Barth et al. | 395/853 |
| 5,881,154 A | 3/1999 | Nohara et al. | |
| 5,917,760 A | 6/1999 | Millar | |
| 5,926,838 A | 7/1999 | Jeddeloh | 711/167 |
| 5,928,343 A | 7/1999 | Farmwald et al. | 710/104 |
| 5,930,273 A | 7/1999 | Mukojima | 714/776 |
| 5,959,914 A | 9/1999 | Gates et al. | |
| 5,973,951 A | 10/1999 | Bechtolsheim et al. | 365/52 |
| 5,974,493 A | 10/1999 | Okumura et al. | 710/307 |
| 5,995,405 A | 11/1999 | Trick | 365/63 |
| 5,995,988 A * | 11/1999 | Freidin et al. | 708/232 |
| 6,003,121 A | 12/1999 | Wirt | |
| 6,011,732 A | 1/2000 | Harrison et al. | |
| 6,038,132 A | 3/2000 | Tokunaga et al. | 361/760 |
| 6,049,476 A | 4/2000 | Laudon et al. | 365/52 |
| 6,076,158 A | 6/2000 | Sites et al. | 712/230 |
| 6,078,515 A | 6/2000 | Nielsen et al. | 365/63 |
| 6,081,868 A | 6/2000 | Brooks | |
| 6,085,276 A | 7/2000 | VanDoren et al. | |
| 6,088,817 A | 7/2000 | Haulin | |
| 6,096,091 A | 8/2000 | Hartmann | 716/17 |
| 6,128,746 A | 10/2000 | Clark et al. | 713/324 |
| 6,145,028 A | 11/2000 | Shank et al. | |
| 6,158,040 A | 12/2000 | Ho | |
| 6,170,047 B1 | 1/2001 | Dye | 711/170 |
| 6,170,059 B1 | 1/2001 | Pruett et al. | 713/200 |
| 6,173,382 B1 | 1/2001 | Dell et al. | 711/170 |
| 6,185,718 B1 | 2/2001 | Dell et al. | |
| 6,198,304 B1 | 3/2001 | Sasaki | |
| 6,215,686 B1 | 4/2001 | Deneroff et al. | 365/52 |
| 6,216,247 B1 | 4/2001 | Creta et al. | |
| 6,219,288 B1 | 4/2001 | Braceras et al. | |
| 6,219,760 B1 | 4/2001 | McMinn | |
| 6,233,639 B1 | 5/2001 | Dell et al. | |
| 6,260,127 B1 | 7/2001 | Olarig et al. | 711/167 |
| 6,262,493 B1 | 7/2001 | Garnett | |
| 6,285,172 B1 | 9/2001 | Torbey | |
| 6,292,903 B1 | 9/2001 | Coteus et al. | 713/401 |
| 6,301,636 B1 | 10/2001 | Schultz et al. | 711/108 |
| 6,308,247 B1 | 10/2001 | Ackerman et al. | |
| 6,317,352 B1 | 11/2001 | Halbert et al. | 365/52 |
| 6,321,343 B1 | 11/2001 | Toda | 713/600 |
| 6,338,113 B1 | 1/2002 | Kubo et al. | 711/105 |
| 6,349,390 B1 | 2/2002 | Dell et al. | |
| 6,357,018 B1 | 3/2002 | Stuewe et al. | |
| 6,370,631 B1 | 4/2002 | Dye | 711/170 |
| 6,378,018 B1 | 4/2002 | Tsern et al. | 710/129 |
| 6,381,685 B2 | 4/2002 | Dell et al. | |
| 6,393,512 B1 | 5/2002 | Chen et al. | |
| 6,393,528 B1 | 5/2002 | Arimilli et al. | 711/137 |
| 6,408,398 B1 | 6/2002 | Freker et al. | |
| 6,425,044 B1 | 7/2002 | Jeddeloh | |
| 6,446,174 B1 | 9/2002 | Dow | |
| 6,446,224 B1 | 9/2002 | Chang et al. | |
| 6,461,013 B1 | 10/2002 | Simon | |
| 6,467,013 B1 | 10/2002 | Nizar | |
| 6,473,836 B1 | 10/2002 | Ikeda | 711/137 |
| 6,477,614 B1 | 11/2002 | Leddige et al. | |
| 6,477,615 B1 | 11/2002 | Tanaka | |
| 6,483,755 B2 | 11/2002 | Leung et al. | 365/189.05 |
| 6,484,271 B1 | 11/2002 | Gray | |
| 6,487,102 B1 | 11/2002 | Halbert et al. | |
| 6,487,627 B1 | 11/2002 | Willke et al. | 710/306 |
| 6,493,250 B2 | 12/2002 | Halbert et al. | 365/63 |
| 6,496,540 B1 | 12/2002 | Widmer | 375/242 |
| 6,496,910 B1 | 12/2002 | Baentsch et al. | 711/165 |
| 6,499,070 B1 | 12/2002 | Whetsel | 710/71 |
| 6,502,161 B1 | 12/2002 | Perego et al. | 711/5 |
| 6,505,305 B1 | 1/2003 | Olarig | |
| 6,507,888 B2 | 1/2003 | Wu et al. | 711/105 |
| 6,510,100 B2 | 1/2003 | Grundon et al. | 365/233 |
| 6,513,091 B1 | 1/2003 | Blackmon et al. | 710/316 |
| 6,526,469 B1 | 2/2003 | Drehmel et al. | |
| 6,530,007 B2 | 3/2003 | Olarig | |
| 6,532,525 B1 | 3/2003 | Aleksic et al. | 711/168 |
| 6,546,359 B1 | 4/2003 | Week | 702/186 |
| 6,549,971 B1 | 4/2003 | Cecchi et al. | 710/306 |
| 6,553,450 B1 | 4/2003 | Dodd et al. | 711/105 |
| 6,557,069 B1 | 4/2003 | Drehmel et al. | 710/307 |
| 6,564,329 B1 | 5/2003 | Cheung et al. | 713/322 |
| 6,584,576 B1 | 6/2003 | Co | |
| 6,587,912 B2 | 7/2003 | Leddige et al. | |
| 6,590,827 B2 | 7/2003 | Chang et al. | |
| 6,594,713 B1 | 7/2003 | Fuocco et al. | |
| 6,594,748 B1 | 7/2003 | Lin | |
| 6,601,121 B2 | 7/2003 | Singh et al. | 710/112 |
| 6,601,149 B1 | 7/2003 | Brock et al. | |
| 6,604,180 B2 | 8/2003 | Jeddeloh | |
| 6,611,905 B1 | 8/2003 | Grundon et al. | 711/167 |
| 6,622,217 B2 | 9/2003 | Gharacorloo et al. | 711/141 |
| 6,622,227 B2 | 9/2003 | Zumkehr et al. | |
| 6,625,687 B1 | 9/2003 | Halber et al. | 711/105 |
| 6,625,702 B2 | 9/2003 | Rentschler et al. | |
| 6,628,538 B2 | 9/2003 | Funaba et al. | 365/63 |
| 6,631,439 B2 | 10/2003 | Saulsbury et al. | |
| 6,636,957 B2 | 10/2003 | Stevens et al. | |
| 6,643,745 B1 | 11/2003 | Palanca et al. | |
| 6,671,376 B1 | 12/2003 | Koto et al. | 380/210 |
| 6,678,811 B2 | 1/2004 | Rentschler et al. | 711/167 |
| 6,681,292 B2 | 1/2004 | Creta et al. | |
| 6,684,320 B2 | 1/2004 | Mohamed et al. | |
| 6,697,919 B2 | 2/2004 | Gharachorloo et al. | 711/141 |
| 6,704,842 B1 | 3/2004 | Janakiraman et al. | |
| 6,721,185 B2 | 4/2004 | Dong et al. | |
| 6,721,944 B2 | 4/2004 | Chaudhry et al. | |
| 6,738,836 B1 | 5/2004 | Kessler et al. | |
| 6,741,096 B2 | 5/2004 | Moss | |
| 6,748,518 B1 | 6/2004 | Guthrie et al. | |
| 6,754,762 B1 | 6/2004 | Curley | |
| 6,766,389 B2 | 7/2004 | Hayter et al. | |
| 6,775,747 B2 | 8/2004 | Venkatraman | |

| Patent No. | Date | Inventor | Class |
|---|---|---|---|
| 6,791,555 B1 | 9/2004 | Radke et al. | |
| 6,792,495 B1 | 9/2004 | Garney et al. | |
| 6,799,241 B2 | 9/2004 | Kahn et al. | |
| 6,832,329 B2 | 12/2004 | Ahrens et al. | |
| 6,839,393 B1 | 1/2005 | Sidiropoulos | 375/371 |
| 6,845,472 B2 | 1/2005 | Walker et al. | |
| 6,847,583 B2 | 1/2005 | Janzen et al. | |
| 6,851,036 B1 | 2/2005 | Toda et al. | |
| 6,874,102 B2 | 3/2005 | Doody et al. | |
| 6,877,076 B1 | 4/2005 | Cho et al. | |
| 6,877,078 B2 | 4/2005 | Fujiwara et al. | |
| 6,882,082 B2 | 4/2005 | Greeff et al. | |
| 6,889,284 B1 | 5/2005 | Nizar et al. | |
| 6,898,726 B1 | 5/2005 | Lee | |
| 6,910,146 B2 | 6/2005 | Dow | |
| 6,918,068 B2 | 7/2005 | Vail et al. | |
| 6,925,534 B2 | 8/2005 | David | |
| 6,938,119 B2 | 8/2005 | Kohn et al. | |
| 6,944,084 B2 | 9/2005 | Wilcox | |
| 6,948,091 B2 | 9/2005 | Bartels et al. | |
| 6,949,950 B2 | 9/2005 | Takahashi et al. | |
| 6,952,761 B2 | 10/2005 | John | |
| 6,965,952 B2 | 11/2005 | Echartea et al. | |
| 6,977,536 B2 | 12/2005 | Chin-Chieh et al. | 327/116 |
| 6,977,979 B1 | 12/2005 | Hartwell et al. | |
| 6,993,612 B2 | 1/2006 | Porterfield | |
| 6,996,639 B2 | 2/2006 | Narad | |
| 6,996,766 B2 | 2/2006 | Cypher | |
| 7,039,755 B1 | 5/2006 | Helms | |
| 7,047,370 B1 | 5/2006 | Jeter, Jr. et al. | |
| 7,047,371 B2 | 5/2006 | Dortu | |
| 7,047,384 B2 | 5/2006 | Bodas et al. | |
| 7,076,700 B2 | 7/2006 | Rieger | |
| 7,091,890 B1 | 8/2006 | Sasaki et al. | |
| 7,103,792 B2 | 9/2006 | Moon | |
| 7,120,743 B2 | 10/2006 | Meyer et al. | |
| 7,133,790 B2 | 11/2006 | Liou | |
| 7,133,972 B2 | 11/2006 | Jeddeloh | |
| 7,155,016 B1 | 12/2006 | Betts et al. | |
| 7,177,211 B2 | 2/2007 | Zimmerman | 365/201 |
| 7,194,593 B2 | 3/2007 | Schnepper | |
| 7,197,594 B2 | 3/2007 | Raz et al. | |
| 7,197,670 B2 | 3/2007 | Boatright et al. | |
| 7,203,318 B2 | 4/2007 | Collum et al. | |
| 7,206,887 B2 | 4/2007 | Jeddeloh | |
| 7,206,962 B2 | 4/2007 | Deegan et al. | |
| 7,210,059 B2 | 4/2007 | Jeddeloh | |
| 7,216,196 B2 | 5/2007 | Jeddeloh | |
| 7,216,276 B1 | 5/2007 | Azimi et al. | |
| 7,222,213 B2 | 5/2007 | James | |
| 7,227,949 B2 | 6/2007 | Heegard et al. | |
| 7,240,145 B2 | 7/2007 | Holman | |
| 7,260,685 B2 | 8/2007 | Lee et al. | |
| 7,266,634 B2 | 9/2007 | Ware et al. | |
| 7,269,765 B1 | 9/2007 | Charlton et al. | |
| 7,296,129 B2 | 11/2007 | Gower et al. | |
| 7,313,583 B2 | 12/2007 | Porten et al. | |
| 7,319,340 B2 | 1/2008 | Jeddeloh et al. | |
| 7,321,979 B2 | 1/2008 | Lee | |
| 7,334,159 B1 | 2/2008 | Callaghan | |
| 7,353,316 B2 | 4/2008 | Erdmann | |
| 7,363,419 B2 | 4/2008 | Cronin et al. | |
| 7,363,436 B1 | 4/2008 | Yeh et al. | |
| 7,370,134 B2 | 5/2008 | Jeddeloh | |
| 7,376,146 B2 | 5/2008 | Beverly et al. | |
| 7,386,575 B2 | 6/2008 | Bashant et al. | |
| 7,386,771 B2 | 6/2008 | Shuma | |
| 7,404,118 B1 | 7/2008 | Baguette et al. | |
| 7,418,526 B2 | 8/2008 | Jeddeloh | |
| 7,421,525 B2 | 9/2008 | Polzin et al. | |
| 7,430,145 B2 | 9/2008 | Weiss et al. | |
| 7,433,258 B2 | 10/2008 | Rao et al. | |
| 2001/0003839 A1 | 6/2001 | Kondo | 711/144 |
| 2001/0029566 A1 | 10/2001 | Shin | |
| 2001/0029592 A1 | 10/2001 | Walker et al. | |
| 2002/0019926 A1 | 2/2002 | Huppenthal et al. | 712/15 |
| 2002/0059439 A1 | 5/2002 | Arroyo et al. | |
| 2002/0083255 A1 | 6/2002 | Greeff et al. | 710/305 |
| 2002/0103988 A1 | 8/2002 | Dornier | 712/38 |
| 2002/0112119 A1 | 8/2002 | Halbert et al. | 711/115 |
| 2002/0112194 A1 | 8/2002 | Uzelac | 713/500 |
| 2002/0124195 A1 | 9/2002 | Nizar | 713/320 |
| 2002/0124201 A1 | 9/2002 | Edwards et al. | |
| 2002/0174274 A1 | 11/2002 | Wu et al. | 710/100 |
| 2003/0009632 A1 | 1/2003 | Arimilli et al. | |
| 2003/0028701 A1 | 2/2003 | Rao et al. | |
| 2003/0033364 A1 | 2/2003 | Garnett et al. | 709/203 |
| 2003/0051055 A1 | 3/2003 | Parrella et al. | |
| 2003/0056183 A1 | 3/2003 | Kobayashi | |
| 2003/0084309 A1 | 5/2003 | Kohn | 713/189 |
| 2003/0090879 A1 | 5/2003 | Doblar et al. | 361/728 |
| 2003/0105938 A1 | 6/2003 | Cooksey et al. | |
| 2003/0118044 A1 | 6/2003 | Blanc et al. | |
| 2003/0126354 A1 | 7/2003 | Kahn et al. | |
| 2003/0126363 A1 | 7/2003 | David | |
| 2003/0223303 A1 | 12/2003 | Lamb et al. | 365/230.06 |
| 2003/0229770 A1 | 12/2003 | Jeddeloh | |
| 2003/0235222 A1 | 12/2003 | Bridges et al. | |
| 2003/0236959 A1 | 12/2003 | Johnson et al. | 711/167 |
| 2004/0006674 A1 | 1/2004 | Hargis et al. | 711/156 |
| 2004/0015650 A1 | 1/2004 | Zumkehr et al. | |
| 2004/0049723 A1 | 3/2004 | Obara | 714/729 |
| 2004/0078615 A1 | 4/2004 | Martin et al. | |
| 2004/0098546 A1 | 5/2004 | Bashant et al. | |
| 2004/0098549 A1 | 5/2004 | Dorst | |
| 2004/0117588 A1 | 6/2004 | Arimilli et al. | 711/203 |
| 2004/0123222 A1 | 6/2004 | Widmer | |
| 2004/0128474 A1 | 7/2004 | Vorbach | 712/10 |
| 2004/0148482 A1 | 7/2004 | Grundy et al. | |
| 2004/0160832 A1 | 8/2004 | Janzen et al. | |
| 2004/0163028 A1 | 8/2004 | Olarig | |
| 2004/0165609 A1 | 8/2004 | Herbst et al. | |
| 2004/0199363 A1 | 10/2004 | Bohizic et al. | |
| 2004/0205433 A1 | 10/2004 | Gower et al. | |
| 2004/0230718 A1 | 11/2004 | Polzin et al. | 710/22 |
| 2004/0246767 A1 | 12/2004 | Vogt | 365/154 |
| 2004/0250153 A1 | 12/2004 | Vogt | 713/500 |
| 2004/0260909 A1 | 12/2004 | Lee et al. | 711/213 |
| 2004/0260957 A1 | 12/2004 | Jeddeloh et al. | 713/300 |
| 2005/0022065 A1 | 1/2005 | Dixon et al. | |
| 2005/0023560 A1 | 2/2005 | Ahn et al. | 257/200 |
| 2005/0027941 A1 | 2/2005 | Wang et al. | |
| 2005/0033906 A1 | 2/2005 | Mastronarde et al. | |
| 2005/0044305 A1 | 2/2005 | Jakobs et al. | |
| 2005/0050237 A1 | 3/2005 | Jeddeloh | 710/10 |
| 2005/0050255 A1 | 3/2005 | Jeddeloh | 710/317 |
| 2005/0066136 A1 | 3/2005 | Schnepper | 711/154 |
| 2005/0071542 A1 | 3/2005 | Weber et al. | |
| 2005/0071707 A1 | 3/2005 | Hampel | |
| 2005/0078506 A1 | 4/2005 | Rao et al. | |
| 2005/0080581 A1 | 4/2005 | Zimmerman et al. | 702/117 |
| 2005/0081085 A1 | 4/2005 | Ellis et al. | |
| 2005/0081114 A1 | 4/2005 | Ackaret et al. | |
| 2005/0081129 A1 | 4/2005 | Shah et al. | |
| 2005/0086424 A1 | 4/2005 | Oh et al. | |
| 2005/0086441 A1* | 4/2005 | Meyer et al. | 711/158 |
| 2005/0097249 A1 | 5/2005 | Oberlin et al. | |
| 2005/0105350 A1 | 5/2005 | Zimmerman | |
| 2005/0120157 A1 | 6/2005 | Chen et al. | 710/313 |
| 2005/0125702 A1 | 6/2005 | Huang et al. | 713/320 |
| 2005/0125703 A1 | 6/2005 | Lefurgy et al. | 713/320 |
| 2005/0138246 A1 | 6/2005 | Chen et al. | |
| 2005/0138267 A1 | 6/2005 | Bains et al. | 711/100 |
| 2005/0144399 A1 | 6/2005 | Hosomi | 711/145 |
| 2005/0149665 A1 | 7/2005 | Wolrich et al. | |
| 2005/0166006 A1 | 7/2005 | Talbot et al. | |
| 2005/0177677 A1 | 8/2005 | Jeddeloh | |
| 2005/0177690 A1 | 8/2005 | LaBerge | 711/154 |
| 2005/0204216 A1 | 9/2005 | Daily et al. | 714/724 |
| 2005/0216678 A1 | 9/2005 | Jeddeloh | |
| 2005/0220097 A1 | 10/2005 | Swami et al. | |
| 2005/0223196 A1 | 10/2005 | Knowles | |
| 2005/0229132 A1 | 10/2005 | Butt et al. | 716/10 |
| 2005/0248997 A1 | 11/2005 | Lee | |
| 2005/0257005 A1 | 11/2005 | Jeddeloh | |
| 2005/0259496 A1 | 11/2005 | Hsu et al. | 365/226 |
| 2005/0289292 A1 | 12/2005 | Morrow et al. | |
| 2005/0289377 A1 | 12/2005 | Luong | |

| | | | |
|---|---|---|---|
| 2006/0004953 A1 | 1/2006 | Vogt | |
| 2006/0010339 A1 | 1/2006 | Klein | |
| 2006/0036826 A1 | 2/2006 | Dell et al. | |
| 2006/0036827 A1 | 2/2006 | Dell et al. | |
| 2006/0080584 A1 | 4/2006 | Hartnett et al. | |
| 2006/0085602 A1 | 4/2006 | Huggahalli et al. | |
| 2006/0095592 A1 | 5/2006 | Borkenhagen | |
| 2006/0095679 A1 | 5/2006 | Edirisooriya | |
| 2006/0104371 A1 | 5/2006 | Schuermans et al. | |
| 2006/0107175 A1 | 5/2006 | Dell et al. | |
| 2006/0112238 A1 | 5/2006 | Jamil et al. | |
| 2006/0161733 A1 | 7/2006 | Beckett et al. | |
| 2006/0162882 A1 | 7/2006 | Ohara et al. | |
| 2006/0168407 A1 | 7/2006 | Stern | |
| 2006/0179208 A1 | 8/2006 | Jeddeloh | |
| 2006/0190674 A1 | 8/2006 | Poechmueller | |
| 2006/0195631 A1 | 8/2006 | Rajamani | |
| 2006/0206742 A1 | 9/2006 | James | |
| 2006/0212666 A1 | 9/2006 | Jeddeloh | |
| 2006/0224764 A1 | 10/2006 | Shinohara et al. | |
| 2006/0277365 A1 | 12/2006 | Pong | |
| 2006/0288172 A1 | 12/2006 | Lee et al. | |
| 2007/0005922 A1 | 1/2007 | Swaminathan et al. | |
| 2007/0025304 A1 | 2/2007 | Leelahakriengkrai et al. | |
| 2007/0038907 A1 | 2/2007 | Jeddeloh et al. | |
| 2007/0067382 A1 | 3/2007 | Sun | |
| 2007/0083701 A1 | 4/2007 | Kapil | |
| 2007/0160053 A1 | 7/2007 | Coteus | |
| 2008/0043808 A1 | 2/2008 | Hsu et al. | |
| 2008/0162807 A1 | 7/2008 | Rothman et al. | |
| 2008/0163014 A1 | 7/2008 | Crawford et al. | |
| 2008/0222379 A1 | 9/2008 | Jeddeloh | |
| 2009/0006900 A1 | 1/2009 | Lastras-Montano et al. | |

FOREIGN PATENT DOCUMENTS

| | | | |
|---|---|---|---|
| EP | 0470734 | A1 | 2/1992 |
| EP | 0899743 | A2 | 6/1998 |
| EP | 1429340 | A2 | 6/2004 |
| GB | 2396711 | A | 6/2004 |
| JP | 59153353 | A | 9/1984 |
| JP | 0114140 | A | 6/1989 |
| JP | 0432614 | | 11/1992 |
| JP | 10011971 | | 1/1998 |
| JP | 2004139552 | A | 5/2004 |
| JP | 2008003711 | A | 1/2008 |
| WO | 9621188 | | 7/1996 |
| WO | 9812651 | | 3/1998 |
| WO | 0004481 | A2 | 1/2000 |
| WO | 0223353 | A2 | 3/2002 |
| WO | WO2005038660 | | 4/2005 |
| WO | 2007109888 | | 10/2007 |

OTHER PUBLICATIONS

Li, P; Martinez, J.; Tang, J.; Priore, S.,; Hubbard, K.; Jie Xue; Poh, E.; Ong MeiLin; Chok KengYin; Hallmark, C.; Mendez, D.; "Development and evaluation of a high performance fine pitch SODIMM socket package." Electronic Components and Technology Conference, 2004. Proceedings. 54th, vol. 1, pp. 1161-1166, Jun. 1-4, 2004.

PCT International Search Report PCT/EP2006/068984. Mailed Feb. 16, 2007.

PCT International Search Report PCT/EP2007/057916. Mailed Dec. 14, 2007.

International Search Report, International Application No. PCT/EP2007/054929, International Publication No. WO 2007/135144 A1, received Mar. 21, 2008.

PCT Search Report. PCT/EP2007/057915. Mailed Nov. 7, 2007.

International Search Report, International Patent Application No. PCT/US07/75944, mailed Sep. 23, 2008, 3 pages.

European Search Report, European Patent Application No. 05106701.5, mailed Oct. 7, 2008, 5 pages.

European Search Report, European Patent Application No. 05109837.4, mailed Oct. 7, 2008, 5 pages.

Joe Jeddeloh, Fully Buffered DIMM (FB-DIMM), XP002490174, Advanced Systems Technology, Micron Technology, Inc. Apr. 16, 2008, 32 pages.

Timothy J. Dell, "The RAS Implications of DIMM Connector Failure Rates in Large, Highly Available Server Systems", The 53rd IEEE Holm Conference on Electrical Contacts, IEEE, Sep. 16-19, 2007, pp. 256-261.

"Using Dual and Mappable Spare Bus", XP000433763, IBM Technical Disclosure Bulletin, vol. 37, No. 2B, IBM Copr., NY, US, Feb. 1, 1994, pp. 59-63.

"Novel Bus Reconfiguration Scheme With Spare Lines", XP000676205, IBM Technical Disclosure Bulletin, vol. 29, No. 12, IBM Copr., NY, US, May 12, 1987, pp. 5590-5593.

European Search Report, European Patent Application 05106700.7, received Aug. 11, 2008.

Benini, et al., "System-Level Powers Optimization: Techniques and Tools", ACM Transactions on Design Automation of Electronic Systems, vol. 5, No. 2, Apr. 2000, pp. 115-192.

Boudon, et al., "Novel Bus Reconfiguration Scheme With Spare Lines", IBM Technical Disclosure Bulletin, May 1987, vol. 29, No. 12, pp. 1-3.

Brown, et al "Compiler-Based I/O Prefetching for Out-of-Core Applications", ACM Transactions on Computer Systems, vol. 19, No. 2, May 2001, pp. 111-170.

Ghoneima et al.; "Optimum Positioning of Interleaved Repeaters in Bidirectional Buses;" IEEE Transactions on Computer-Aided Design of Integrated Circuits and Systems, vol. 25, No. 3, Mar. 2005, pp. 461-469.

IEEE, "IEEE Standard Test Access Port and Boundary-Scan Architecture", Jul. 23, 2001, IEEE Std 1149-1-2001, pp. 11-13.

JEDEC Solid State Technology Association, "JEDEC Standard: DDR2 SDRAM Specification", Jan. 2004, JEDEC, Revision JESD79-2A, p. 10.

Jungjoon Kim et al.; "Performance and Architecture Features of Segmented Multiple Bus System;" IEEE Computer Society; 1999 International Conference on Parallel Processing (ICPP '99).

Massoud Pedram, "Power Minimization in IC Design Principles and Applications", ACM Transactions on Design Automation of Electronic Systems vol. 1, No. 1, Jan. 1996, pp. 3-56.

Natarajan, et al., "A Study of Performance Impact of Memory Controller Features in Multi-Processor Server Environment", pp. 80-87. NB940259 (IBM Technical Disclosure Bulletin, Feb. 1994; vol. 37; pp. 59-64).

Nilsen, "High-Level Dynamic Memory Management for Object-Oriented Real-Time Systems", pp. 86-93.

P.R. Panda, "Data and Memory Optimization Techniques for Embedded Systems", ACM Transactions on Design Automation of Electronic Systems, vol. 6, No. 2, Apr. 2001, pp. 149-206.

Penrod, Lee, "Understanding System Memory and CPU Speeds: A laymans guide to the Front Side Bus (FSB)", Dec. 28, 2005, Direction . Org, pp. 1-5, http://www.directron.com/directron/fsbguide.html. [online];[retrieved on Feb. 23, 2006]; retrieved from the Internet.

Rosenberg, "Dictionary of Computers, Information Processing & Telecommuications", Second Edition, John Wiley & Sons, Inc. 1987. 3 pgs.

Seceleanu et al.; "Segment Arbiter as Action System;" IEEE 2003 pp. 249-252.

Singh, S., et al., "Bus Sparing for Fault-Tolerant System Design", IBM Technical Disclosure Bulletin, Dec. 1991, vol. 34, No. 71, pp. 117-118.

Sivencrona et al.; "RedCAN™: Simulations of two Fault Recovery Algorithms for CAN;" Proceedings for the 10th IEEE Pacific Rim International Symposium on Dependable Computing (PRDC'04); 2005.

U.S. Appl. No. 11/419,586, filed May 22, 2006. Robert Tremaine. "Systems and Methods for Providing Remote Pre-Fetch Buffers".

Wang, et al., "Guided Region Prefetching: A Cooperative Hardware/Software Approach", pp. 388-398.

Wikipedia, Serial Communications, [online], [retrieved Apr. 10, 2007 from the Internet], http://en.wikipedia.org/wiki/Serial_communications,p. 1.

IBM. IBM WebSphere Enterprise Service Bus. Version 6.0.2 2006 (165-0071-USC NOA Jun. 12, 2009).

BEA Systems Inc. Integration of Clustered BEA AquaLogic Service Bus Domain and Remote Tibco Enterprise Message Service 4.2.0 for Messaging Application in SOA. BEA White Paper. 2006 (165-0071-USC NOA Jun. 12, 2009).

Oracle. Oracle Enterprise Service Bus. Oracle Data Sheet. Oct. 2006 (165-0071-USC NOA Jun. 12, 2009).

* cited by examiner

METHOD AND SYSTEM FOR PROVIDING FRAME START INDICATION IN A MEMORY SYSTEM HAVING INDETERMINATE READ DATA LATENCY

CROSS-REFERENCE TO RELATED APPLICATIONS

This application is a continuation-in-part of U.S. patent application Ser. No. 11/289,193 filed Nov. 28, 2005, the contents of which are incorporated by reference herein in their entirety.

BACKGROUND OF THE INVENTION

This invention relates to memory systems comprised of hub devices connected to a memory controller by a daisy chained channel. The hub devices are attached to, or reside upon, memory modules that contain memory devices. More particularly, this invention relates to the flow control of read data and the identification of read data returned to the controller by each hub device.

Many high performance computing main memory systems use multiple fully buffered memory modules connected to a memory controller by one or more channels. The memory modules contain a hub device and multiple memory devices. The hub device fully buffers command, address and data signals between the memory controller and the memory devices. The flow of read data is controlled using either a leveled latency or position dependant latency technique. In both cases, the memory controller is able to predict the return time of read data requested from the memory modules and to schedule commands to avoid collisions as read data is merged onto the controller interface by each memory module.

In some cases, the memory controller is able to issue a read data delay adder along with the read command. This instructs the targeted hub device to add additional delay to the return of read data in order to simplify the issuing of commands and to avoid collisions. In all cases, the read data must be returned in the order in which it was requested. Further, the total read data latency must be completely predictable by the memory controller. During run time operations, these two restrictions result in additional gaps being added to packets of read data that are returned from the memory modules. This adds latency to the average read operation. In addition, hubs are not able to use indeterminate techniques to return read data faster or slower than normal. These techniques include, but are not limited to, caching read data locally, reading memory devices speculatively, independently managing memory device address pages, data compression, etc.

To optimize average read data latency under real workload conditions, and to enable advanced hub device capabilities, what is needed is a way to allow memory modules to return read data to the memory controller at an unpredicted time. This must be done in a way that does not corrupt read data and that allows the memory controller to identify each read data packet. Preventing data corruption by avoiding data collisions is especially complicated as hub devices merge local read data onto a cascaded memory controller channel.

BRIEF SUMMARY OF THE INVENTION

An exemplary embodiment includes a method for providing frame start indication in a memory system having indeterminate read data latency. The method includes receiving a data transfer and determining if the data transfer includes a frame start indicator. The method also includes capturing the data transfer and "n" subsequent data transfers in response to determining that the data transfer includes a frame start indicator. The data transfer and the "n" subsequent data transfers comprise a data frame.

Another exemplary embodiment includes a hub device for providing frame start indication in a memory system having indeterminate read data latency. The hub device includes a mechanism for receiving data transfers via an upstream or downstream channel and for determining if a data transfer includes a frame start indicator. The hub device also includes a mechanism for capturing the data transfer and "n" subsequent data transfers in response to determining that the data transfer includes the frame start indicator. The data transfer and the "n" subsequent data transfers comprise a data frame. The hub device further includes a mechanism for transmitting the data frames via an upstream or downstream channel, each transmitted data frame including a frame start indicator.

Another exemplary embodiment includes a memory controller in a memory system having indeterminate read data latency. The memory controller includes a mechanism for receiving data transfers via an upstream channel and for determining if a data transfer includes a frame start indicator. The memory controller also includes a mechanism for capturing the data transfer and "n" subsequent data transfers in response to determining that the data transfer includes the frame start indicator. The data transfer and the "n" subsequent data transfers comprise a data frame and the data frame includes a read data identification tag. The memory controller further includes a mechanism for associating the data frame with its corresponding read instruction issued by the memory controller using the read data identification tag.

A further exemplary embodiment includes a memory system having indeterminate read data latency. The memory system includes a memory controller and one or more hub devices in communication with the memory controller in a cascade interconnect manner. The memory controller receives data transfers via the upstream channel and determines if all or a subset of the data transfers comprise a data frame by detecting a frame start indicator. The data frames includes an identification tag that is utilized by the memory controller to associate the data frame with a corresponding read instruction issued by the memory controller. The one or more hub devices receive the data transfers via the upstream channel or the downstream channel and determine if all or a subset of the data transfers comprise a data frame by detecting the frame start indicator.

BRIEF DESCRIPTION OF THE DRAWINGS

Referring now to the drawings wherein like elements are numbered alike in the several FIGURES.

DETAILED DESCRIPTION OF THE PREFERRED EMBODIMENTS

Exemplary embodiments utilize controller channel buffers (CCBs), read data frame formats with identification tags and a preemptive data merge technique to enable minimized and indeterminate read data latency. Exemplary embodiments allow memory modules to return read data to a memory controller at an unpredicted time. Identification tag information is added to the read data packet to indicate the read command that the data is a result of, as well as the hub where the data was read. The identification tag information is utilized by the controller to match the read data packet to the read commands issued by the controller. By using the identification tag information, read data can be returned in an order that is different from the issue order of the corresponding read commands.

Exemplary embodiments also provide a preemptive data merge process to prevent data collisions on the upstream channel when implementing the indeterminate read data latency. A CCB is added to the hub device to temporarily store read data. When a memory device on the memory module reads data, the data is transferred from the memory interface to the buffer. When the hub device detects that an upstream data packet (i.e., a data packet being sent to the controller from a hub device that is downstream from the detecting hub device) is not in the middle of being transferred into the detecting hub device via an upstream channel (it typically tales several transfers to send the entire data packet), the detecting hub device checks to see if there is a read data packet in its CCB that is waiting to be sent upstream. If the hub device detects a read data packet in the CCB it drives the read data packet from the CCB onto the upstream data bus. In the meantime, if a new upstream data packet is received via the upstream data bus, the data packet is stored in the CCB on the hub device. In this manner, data packets coming upstream do not collide with data packets being sent upstream from the CCB on the hub device. In the case where there is more than one data packet in the CCB, a variety of methods may be implemented to determine which data packet to send next (e.g., the data packet from the oldest read command may be sent first).

Figure 1:
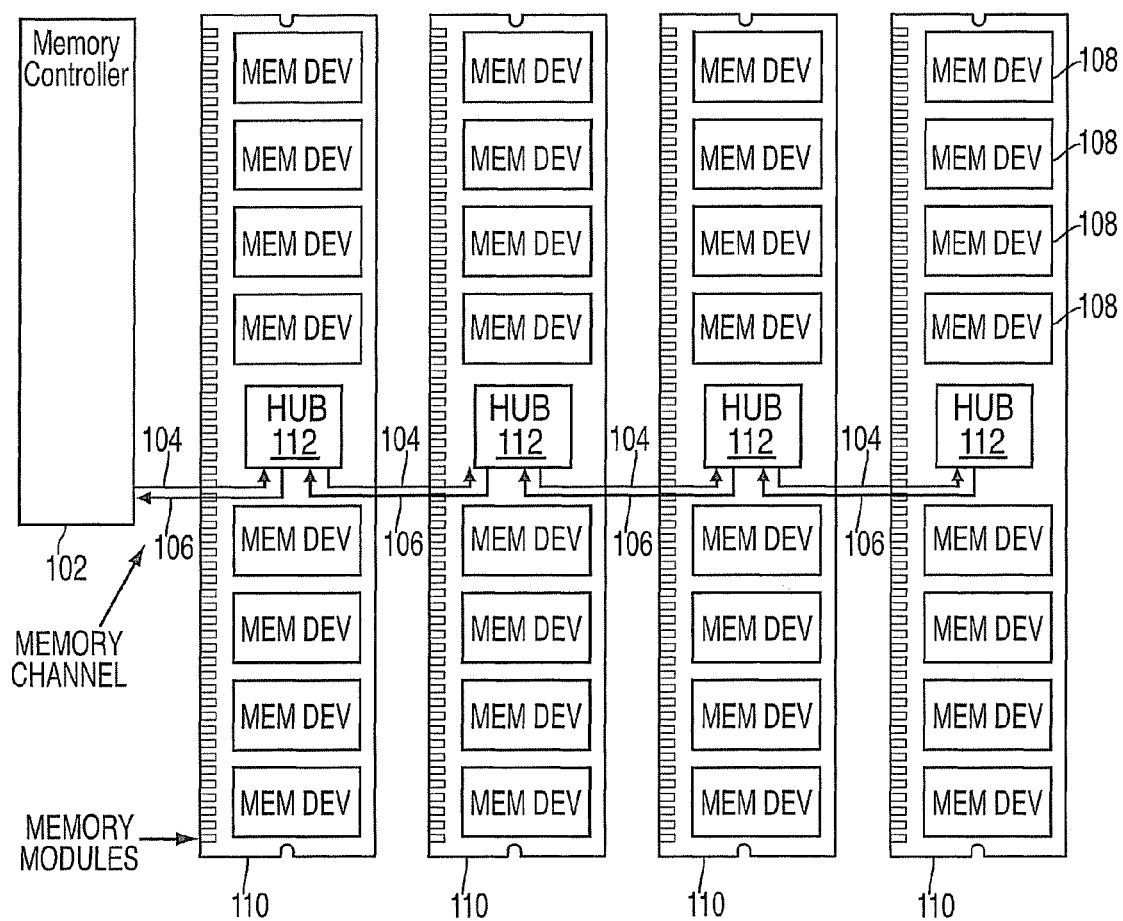
FIG. 1 depicts an exemplary memory system with multiple levels of daisy chained memory modules with point-to-point connections.

Exemplary embodiments apply to memory systems constructed of one or more memory modules 110 that are connected to a memory controller 102 by a daisy chained memory channel 114 as depicted in FIG. 1. The memory modules 110 contain both a hub device 112 that buffers commands, address and data signals to and from the controller memory channel 114 as well as one or more memory devices 108 connected to the hub device 112. The downstream portion of the memory channel 114, the downstream channel 104, transmits write data and memory operation commands to the hub devices 112. The upstream portion of the controller channel 114, the upstream channel 106, returns requested read data (referred to herein as upstream data packets).

Figure 2:
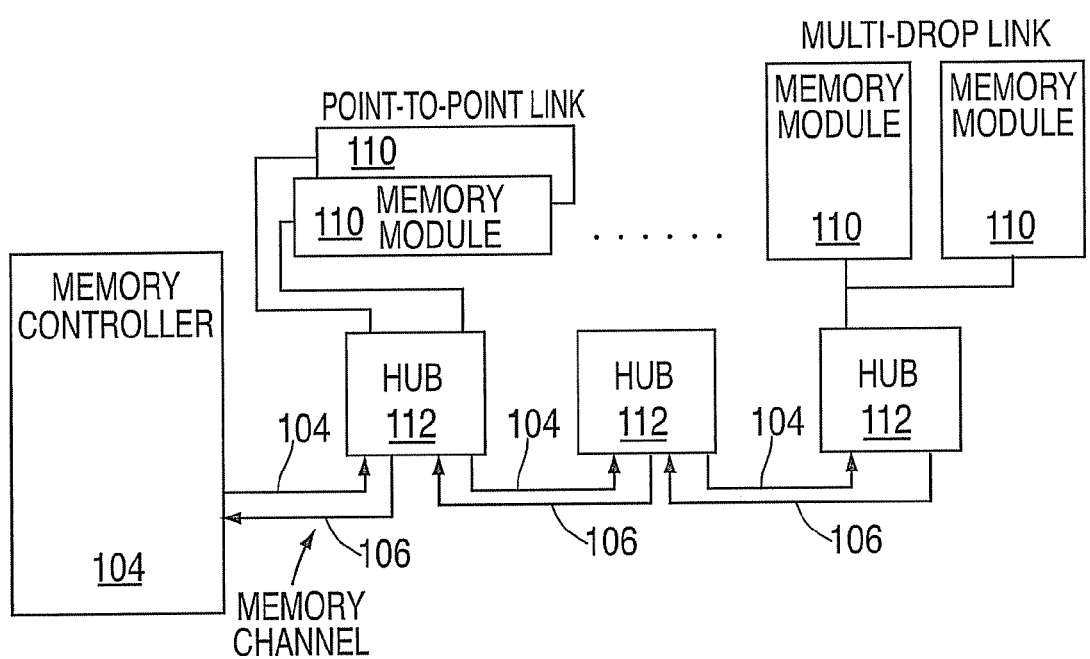
FIG. 2 depicts an exemplary memory system with hub devices that are connected to a memory modules and to a memory controller by a daisy chained channel.

FIG. 2 depicts an alternate exemplary embodiment that includes a memory system constructed of one or more memory modules 110 connected to hub devices 112 that are further connected to a memory controller 102 by a daisy chained memory channel 114. In this embodiment, the hub device 112 is not located on the memory module 110; instead the hub device 112 is in communication with the memory module 110. As depicted in FIG. 2, the memory modules 110 may be in communication with the hub devices 112 via multidrop connections and/or point-to-point connections. Other hardware configurations are possible, for example exemplary embodiments may utilize only a single level of daisy chained hub devices 112 and/or memory modules 110.

Figure 3:
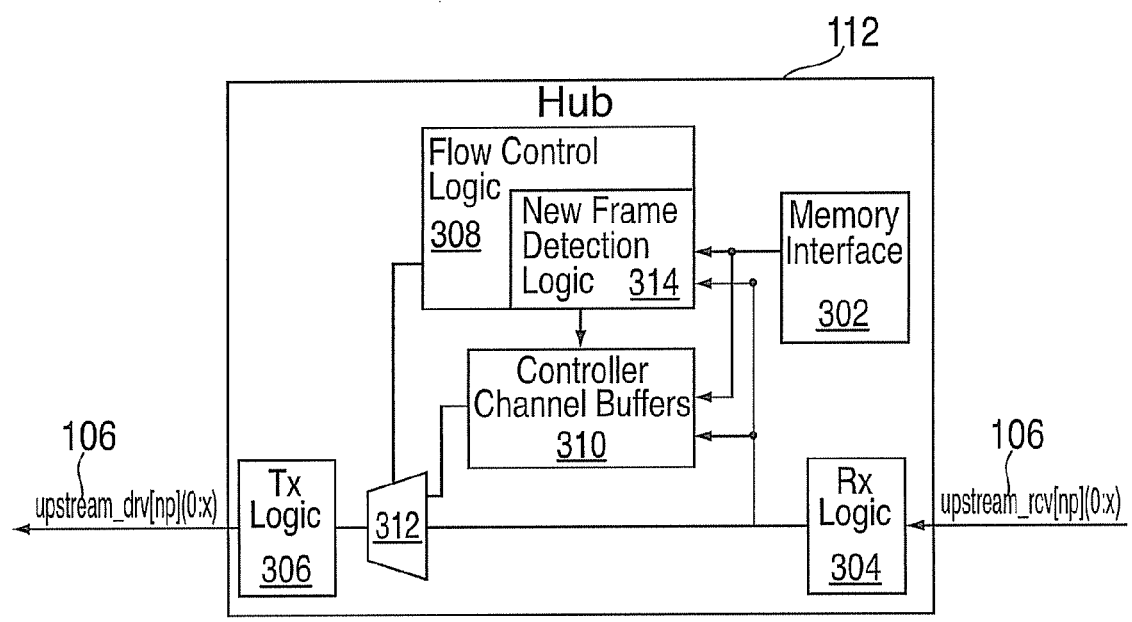
FIG. 3 depicts a hub logic device that may be utilized by exemplary embodiments.

FIG. 3 depicts a hub device 112 with flow control logic 308 utilized by exemplary embodiments to perform the processing described herein. The hub device 112 and the components within the hub device 112 may be implemented in hardware and/or software. The hub device 112 receives upstream data packets on the upstream channel 104 via the receiver logic 304 (also referred to herein as an upstream receiver). The upstream data packets are data packets being sent to the controller 102 from a hub device 112 that is downstream from the receiving hub device 112. An upstream data packet can be sent to the driver logic 306 (also referred to herein as the upstream driver) to be driven towards the controller 102 on the upstream channel 106 or, if the upstream channel 106 is busy, the upstream data packet can be temporarily stored in the CCB 310 on the hub device 112. The destination of the upstream data packet is determined by the flow control logic 308 and implemented by sending a signal to the local data mutliplexor 312.

In exemplary embodiments, CCBs 310, or buffer devices, reside in the hub device 112 and safely capture upstream data packet transfers (via the receiver logic 304) that are shunted into the CCB 310 while the hub device 112 is merging its local data packets onto the upstream channel 106. Local data packets are data packets that are read from memory devices 108 attached to the memory module 110 being directed by the hub device 112. These memory devices 108 are also referred to herein as local storage devices. The data read from the local storage devices, the local data packets, are formatted for return on an upstream controller interface via the upstream driver and stored in the CCB 310. The formatting includes serializing the local data packet into the proper frame format (e.g., see exemplary frame format depicted in FIG. 5), and inserting values into the identification tag (sourced from the read request), first transfer field, and bus cyclical redundancy code (CRC) field. In exemplary embodiments, the formatting of the local data packet is performed as part of storing the local data packet into the CCB 310.

When a data packet is received at the memory interface 302, it is stored into the CCB 310 while the local data packets are waiting to be merged onto the upstream channel 106 (via the driver logic 306). The identification tag within the data packet allows the memory controller 102 to correlate a returned read data packet with its corresponding read data request command. The data packet also contains a small, easy to decode 'start', or first transfer ('ft') field (also referred to herein as a frame start indicator) delivered near the beginning of an upstream read data frame (data packets are formatted as read data frames) which indicates that a read data frame is present in the data packet. In an exemplary embodiment, this is used by the new frame detection logic 314 in the flow control logic 308 in the hub device 112 to monitor the channel read data activity.

When there is data in the CCBs 310 from either a local read operation or from a previously shunted read data packet from a downstream hub device (the data packets in the CCB are referred to herein as stored data packets), the hub device 112 will merge it onto the upstream channel 106 via the driver logic 306 as soon as it is allowed. The hub device 112 merges local data onto the upstream channel 106 whenever the upstream channel 106 is idle, or immediately following the last transfer of a data packet that is currently in progress. Read data frames will never be bisected using this method, but read data frames that are in flight on the upstream channel 106 that have not yet arrived at a hub device's 112 local data multiplexer 312 may be preempted and shunted into the CCB 310. This allows gaps in read data on the upstream channel 106 to be minimized which increases bus efficiency and results in reduced average read data latency under real world work load conditions.

When there are multiple read data packets present in the CCBs 310, the hub device 112 can be configured to send the read data packet corresponding to the earliest read command. This minimizes undue latency on read requests issued to hub devices 112 that are many daisy chain positions away from the memory controller 102. Other CCB 310 unload prioritization algorithms may also be implemented. For example, the identification tag field of the read data frame may contain a priority field. The priority field can be used to guide the unloading of the CCBs 310. Alternatively, priority information may be delivered as the read data is requested. Hub devices 112 can then compare the identification tag to previously recorded priority information to determine the location in the CCB 310 to send next. A method may also be employed that occasionally sends lower priority data before high priority data to ensure that low priority data is not completely stalled by requests that have been tagged with a higher priority.

Figure 4:
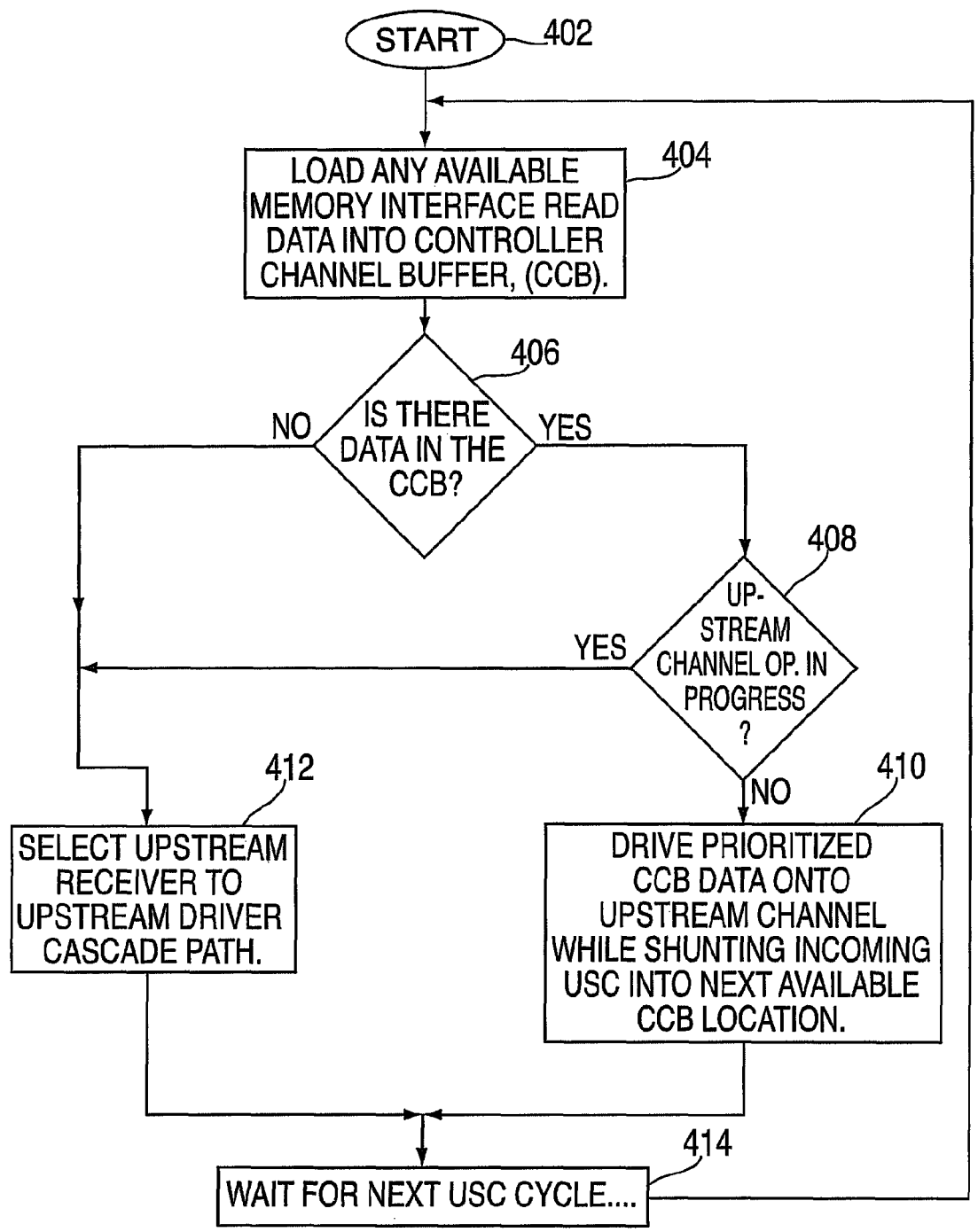
FIG. 4 is a exemplary process flow implemented by the hub logic device in exemplary embodiments.

FIG. 4 is a process flow that is facilitated by the flow control logic 308 located in the hub device 112 in exemplary embodiments. The process depicted in FIG. 4 performs preemptive local data merge and may be implemented by a mechanism including hardware and/or software instructions such as a finite state machine in the flow control logic 308. The process starts at block 402 and is repeated, in exemplary embodiments, on a periodic basis (e.g., after each controller channel transfer, or upstream channel cycle). At block 404 any local read data packets (i.e., from memory devices 108 on memory modules 110 attached to the hub device 112) in the memory interface 302 are loaded into the CCB 310. This insures that the flow control logic 308 is aware of and managing the upstream driving of local read data. At block 406, it is determined if there is data in the CCB 310. If there is no data in the CCB 310, then the data is routed from the receiver logic 304 to the driver logic 306 at block 412. The routing is directed by the flow control logic 308 by setting the local data multiplexer 312 to send the upstream data packet to the driver logic 306 for driving the upstream data packet onto the upstream channel 106 towards the controller 102. Processing then continues at 414, where processing is sent back to block 404 at the next upstream channel cycle.

If it is determined at block 406, that there is data in the CCB 310 then block 408 is performed to determine if an upstream channel operation is in process (i.e., is an upstream data packet or a local read data packet in the middle of being driven onto the upstream channel 106 via the driver logic 306). Processing continues at block 412 if an upstream channel operation is in process (i.e., the driver is busy). At block 412, upstream read data packets are routed from the receiver logic 304 to the driver logic 306 by setting the local data multiplexer 312 to send the upstream data packet to the driver logic 306. Alternatively, processing continues at block 410 if an upstream channel operation is not in process (i.e., the driver is idle) and there is data in the CCB 310. At block 410, data from the CCB 310 is driven onto the upstream channel 106 while any data packets received in the receiver logic 304 from the upstream channel 106 are shunted (stored) into the next available CCB 310 location. The shunting is performed by the flow control logic 308 directing the upstream data packets to be loaded into the CCB 310. Processing then continues at 414 which sends processing back to block 404 at the next upstream channel cycle.

Figure 5:
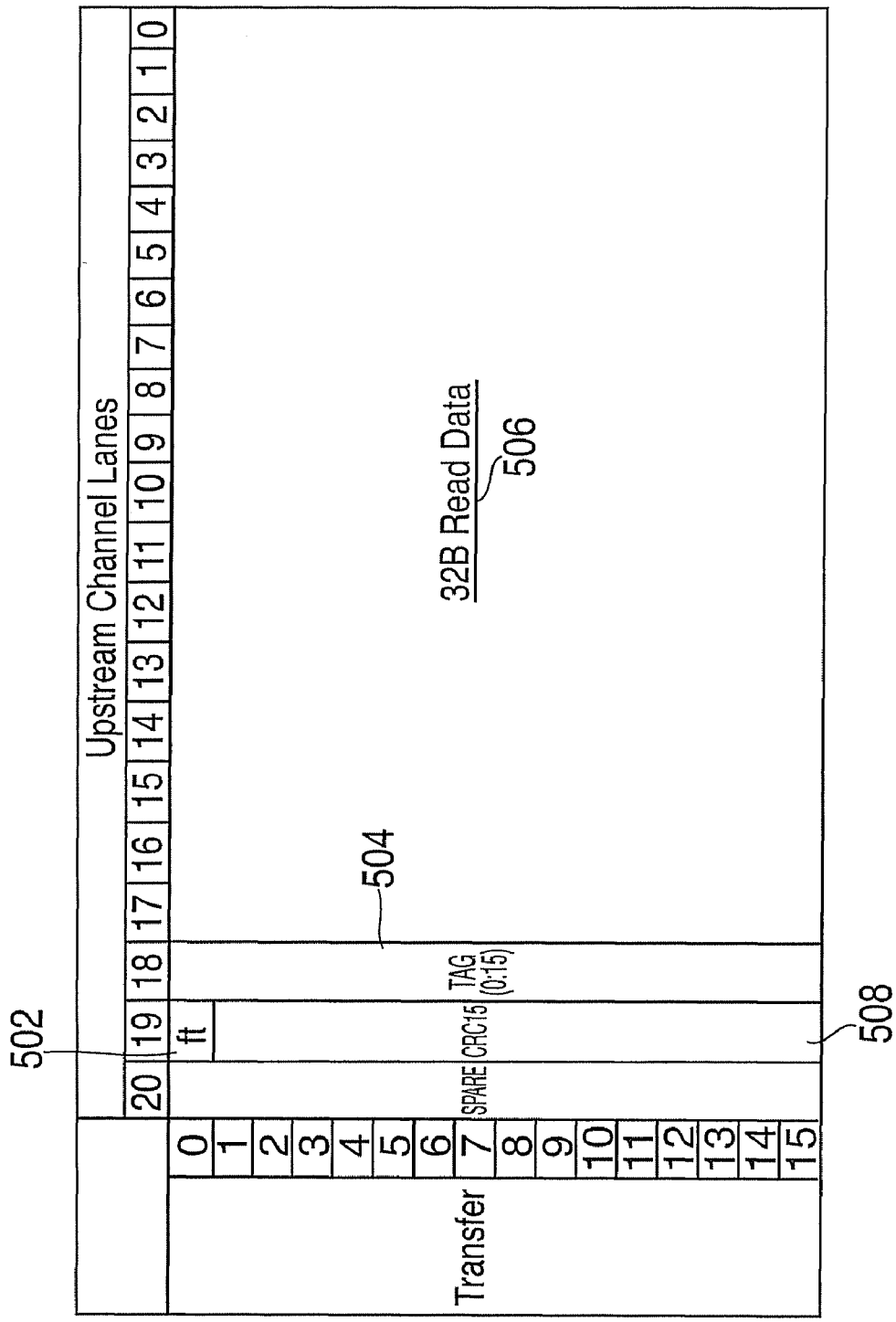
FIG. 5 is a read data format that may be utilized by exemplary embodiments.

FIG. 5 is an exemplary read data frame format for upstream data packets and local read data packets on the upstream channel 106. The frame format depicted in FIG. 5 uses twenty-one signal lanes and each packet includes sixteen transfers. It includes a one bit frame start indicator 502 and an identification tag 504, as well as read data 506 and bus CRC bits 508 for transmission error detection. The read data 506 includes 256 bits (32B) of read data plus additional bits that may be utilized for ECC. Other combinations of signal lanes and transfer depths can be used to create frame formats that include a frame start indicator 502, read data identification tag 504 and read data 506 that are compatible with this invention.

As described previously, the frame format includes a one bit frame start indicator 502 in the embodiment depicted in FIG. 5 (other frame start indicator lengths may also be implemented). In an exemplary embodiment, the frame start indicator 502 is utilized by the memory system (e.g., the memory controller, the hub device) to differentiate idle transfers (e.g., unused bus cycles) from frames comprised of requested and/or un-requested data. Detecting the start of a new frame, as described herein, is performed by new frame detection logic 904 located in a memory controller 902 and/or by the frame detection logic 314 located in a hub device 112. The logic may be implemented by circuitry and/or software instructions.

Using the frame format shown in FIG. 5, upon receipt of a "1" in the upstream channel lane 19 (e.g. the frame start indicator 502), the receiving device (e.g. upstream hub device 112 or buffer, or memory controller 104) captures the 16 transfers (including the transfer containing the frame start indicator 502) comprising the complete frame, and applies the bus CRC bits 508 (comprising transfers 1 through 15 on lane 19) to the received information to determine if a valid frame was received. As used herein the term "data transfer" refers to the first data transfer (in this example, the transfer containing the frame start indicator 502, transfer "0") and the term "n subsequent data transfers" refers to the rest of the data transfers making up the complete frame (in this example "n" is equal to 15, transfers "1"-"15"). In the exemplary embodiments, "n" may be a different value depending on the number of data transfers that make up a data frame. For example, if 32 transfers make up a data frame, then "n" would be 31.

In the exemplary embodiment depicted in FIG. 5, upstream channel lane 19 (e.g. the lane including the frame start indicator 502) is maintained at a "0" level at all times that the lane is not in use (e.g., all "idle" frames include lane 19 as being decoded as a "0" level).

Further, for bus structures in which one or more bit lanes must switch between "1's" and "0's" periodically to retain bus training to assure data capture, the "idle" definition in the exemplary embodiment is changed consistent with the selected training method to assure that the identification of an "idle" condition is easily and accurately differentiated from valid frames. In an exemplary embodiment, to retain bus training, bit lane 19 (e.g. the lane containing the frame start indicator bit), during an "idle" state, changes from a "0" to a "1" every other cycle (another, predefined and/or programmable pattern may be used which affects polarity of the bit(s) comprising the "idle", state while assuring bus training requirements are met). In this case, the idle state is defined as a state where at least the bit lane containing the frame start indicator bit follows a predictable pattern indicative of an idle state on the bus. In the exemplary embodiment, a valid frame includes the frame start indicator bit having a polarity (or other comparable signaling method) that is opposite that of an idle state that might be received at that time.

As a further example, upstream channel lane 19 may be encoded as: "1 0 1 0 1 0" starting at a time t0 (the first "1") through time t5 (the last "0"), with each of these levels being indicative of an "idle" frame. A valid frame would invert the frame start indicator bit at the start of the first transfer, and using the same example, a series of four "idle" cycles followed by the start of a new frame at t5 would be encoded as: "1 0 1 0 0" where the "0" in position t5 indicates a new frame starting with the 5th transfer (the second of the two adjacent 0's). As included herein, the validity of the new frame is determined by the CRC, ECC or other bus fault detection (and possibly correction) method employed to ensure the integrity of communication across the channel. Although one method of training is described relative to the frame start indicator 502, other training methods may be employed which would still permit the identification of "idle" frames, as long as the training method is predictable by some means.

Upon detection of the start of a new frame (e.g. by a "1" on channel lane 19 during an "idle" time), the "new frame detection logic" in flow control logic block 308 then disregards any further "1" bits on lane 19 until the completion of the frame transfer—with the exemplary frame comprising 16 transfers, as shown in FIG. 5, but may also comprise either a fixed or programmable number of transfers (e.g. comprising a known 8, 16, 32 or other transfer count) or including information regarding the length as part of the frame contents (e.g. as a portion of the information in tag 504). Once the frame is received, the new frame detection logic begins to monitor the bus for a new frame start indicator 502. The received frame might be followed by an "idle" period (e.g. lane 19 as a "0") or with the start of a new frame (e.g. lane 19 as a "1"). Although bit lane 19 is identified as the frame start indicator 502 in the exemplary embodiment, the frame start indicator 502 could reside on another bit lane (e.g. 0 or 20), and the physical bit lane position might change as a result of a sparing action which replaces a failing bit lane with a spare bit lane.

As a CRC fault that is identified in response to an identified frame does not permit the system to determine what portion of the frame contents are incorrect (e.g. whether the data 506, the identification tag 504 or the frame start indicator bit was in error) the use of CRC in conjunction with this frame start method will not always permit the recipient (e.g. an upstream hub or controller) to accurately confirm that an error has occurred (since the source of the data is not known with confidence, and/or the error may include an erroneous frame start indicator 502). An alternate exemplary embodiment applies ECC across the upstream frame contents, rather than utilizing CRC, such as taught in U.S. Patent Publication No. 20060107175A1 entitled "System, Method, and Storage Medium for Providing Fault Detection and Correction in a Memory System" to Dell, et. al, of common assignment herewith. The use of an ECC-based bus fault-tolerant mechanism permits identification of frame start indicator errors as compared to a fault in the data being transferred. If the frame start indicator 502 is determined to be in error, the frame contents are discarded by the receiving device as relating to an invalid frame. In the case where the frame start indicator is received as a "0", when sent as a "1" (due to line noise or other faults), neither the CRC or ECC method would work as the existence of a valid frame would not be detected at the start of the first frame, thereby ensuring that the frame would not be properly captured and analyzed by the recipient's CRC or ECC circuitry. In this case, the exemplary system requests the information after a response time limit passes, or if the error is related to un-requested data (e.g. a local pre-fetch, initiated by a hub device 112), the loss of the un-requested data would not impact normal operation.

To improve the ability of detecting that a frame start indicator 502 bit has been missed, an exemplary embodiment includes means for reporting a CRC and/or ECC error indicative of a missed frame. As a very high percentage of frames (e.g. comprised of 16 transfers) will include at least one "1" bit in the bit lane also containing the frame start bit (e.g. lane 19), if the frame start bit has been missed (e.g. the bit is inverted and thereby is indicative of an "idle" state), a subsequent "1" on that bit lane will result in the frame being detected as starting at that point. The probability of that transfer, in addition to the next 15 transfers being detected as a valid frame by the bus CRC or ECC is exceedingly small, and if detected as a valid frame, any "data" extracted from the apparent "frame" subsequently will need to be validated by the integrated data ECC logic by the recipient (e.g. the memory controller 102). The combination of these two events passing the contents of an invalid frame as including valid data is exceedingly small and is not addressed further by this invention.

The most likely response to missing the frame start indicator 502 bit (and identifying the frame as starting with a subsequent "1" on lane 19) is a failure of the CRC or ECC validation of the transfers erroneously identified as comprising a "frame". Should this situation occur, which will also create the possibility of a subsequent frame start indicator 502 being missed for a frame starting immediately or soon after the current frame, the recipient could, in an exemplary embodiment, indicate that a frame error had occurred. Whereas this reporting is well-understood in downstream frame transfers (e.g. transfers from the memory controller 102 to one or more memory modules 110), this reporting structure does not exist with current memory systems in which only predictable response times exist. In an exemplary embodiment, the recipient device (e.g. the memory controller and/or upstream hub device) notifies the memory modules attached to the bus in which the failing frame is detected that a frame failure has occurred. This notification occurs over one or more "error" lines which connect from the memory controller to the one or more memory modules, although alternate exemplary embodiments utilize the high speed downstream bus to provide this status and/or error information.

Although other exemplary embodiments utilize a "handshake" or "acknowledge" for the identification of errors, a method consisting of the reporting errors, and not the reporting of valid transfers, is preferable due to the downstream bandwidth requirement with the latter method. In response to failures, methods may be implemented in the sender's logic such as a re-try feature (where upstream frame contents are retained for a time period to permit a re-try in case an error is identified) to further address the rare failure cases. In most cases, missing an upstream frame will simply require that a new read operation be initiated by the controller, once the controller determines that the requested data has not been received. The loss of un-requested (e.g. pre-fetch data) simply requires that the memory controller access the memory module, instead of storage locations within/near the controller, and as such, does not constitute a system failure. Other exemplary embodiments include other methods for confirming receipt of information, rather than the reporting of failures.

Further exemplary implementations may be implemented, using the single frame start bit, which will further improve the operability and reliability of a system operable with indeterminate read data latency. In an exemplary embodiment, the frame start indicator 502 is comprised of a single transfer on a single bit lane (e.g. bit lane 19 as a "1", as shown in FIG. 5). The idle case, however, requires that multiple bit lanes (e.g. 19, 18 and 17, as well as others, if desired) all be set to a condition such as "0". In this case, which is closely related to the single frame start bit indicator method, the first bit (e.g. lane 19 on transfer 0) is set to a state opposite that of an "idle" state (e.g. to a "1"), indicating that a frame transfer is being initiated. Since an idle state requires that multiple bit lanes all be at a predetermined state (such as "0"), a "0" on bit lane 19 (indicating the likelihood that an idle frame was being received), and a "1" on one or more of the remainder of the lanes comprising the idle decode state indicates the possibility that the transmission of a valid frame is being attempted. In this case, the recipient might capture the "potential" frame (e.g. the fall upstream channel width over the 8, 16, 32 etc. transfers) to determine if the remainder of the frame is valid (e.g., ECC and/or CRC could be applied on the data as received and/or with the frame start indicator as a "1"), report a frame error to the memory modules or take other action associated with a defective/failed frame. This method significantly reduces the probability that an intended frame is completely missed by the recipient, thereby negating a minor weakness in the single frame start bit solution. This solution retains the benefit of only requiring a single frame start bit, and thereby minimizing the frame overhead. Variations of this method would be used when bus/channel training is utilized, as described previously.

Yet further embodiments, based on the above method, continue to use a single bit lane for the identification of a frame start, but have the "idle" decode include a pre-defined, non-zero pattern over multiple bit lanes, independent of any training patterns that might also apply (the training method would generally be in addition or on top of the "idle" data pattern). In this exemplary case, a valid frame start is identified by a "1" on upstream channel (bit) lane 19 in FIG. 5 (with the other lanes including information such as tag(s) and/or data consisting of "1's" and "0's", as previously described), and an idle state is identified by a pattern such as "0 1 0" across the first transfer (e.g. "transfer 0" on lanes 19, 18 and 17). In this case, an idle state is well-defined, and any other pattern where bitlane 19 is a "0" and lanes 18 and 17 are not consistent with the "idle" pattern are indicative of a fault condition, which would result in one or more of the error recovery techniques previously described.

Figure 6:
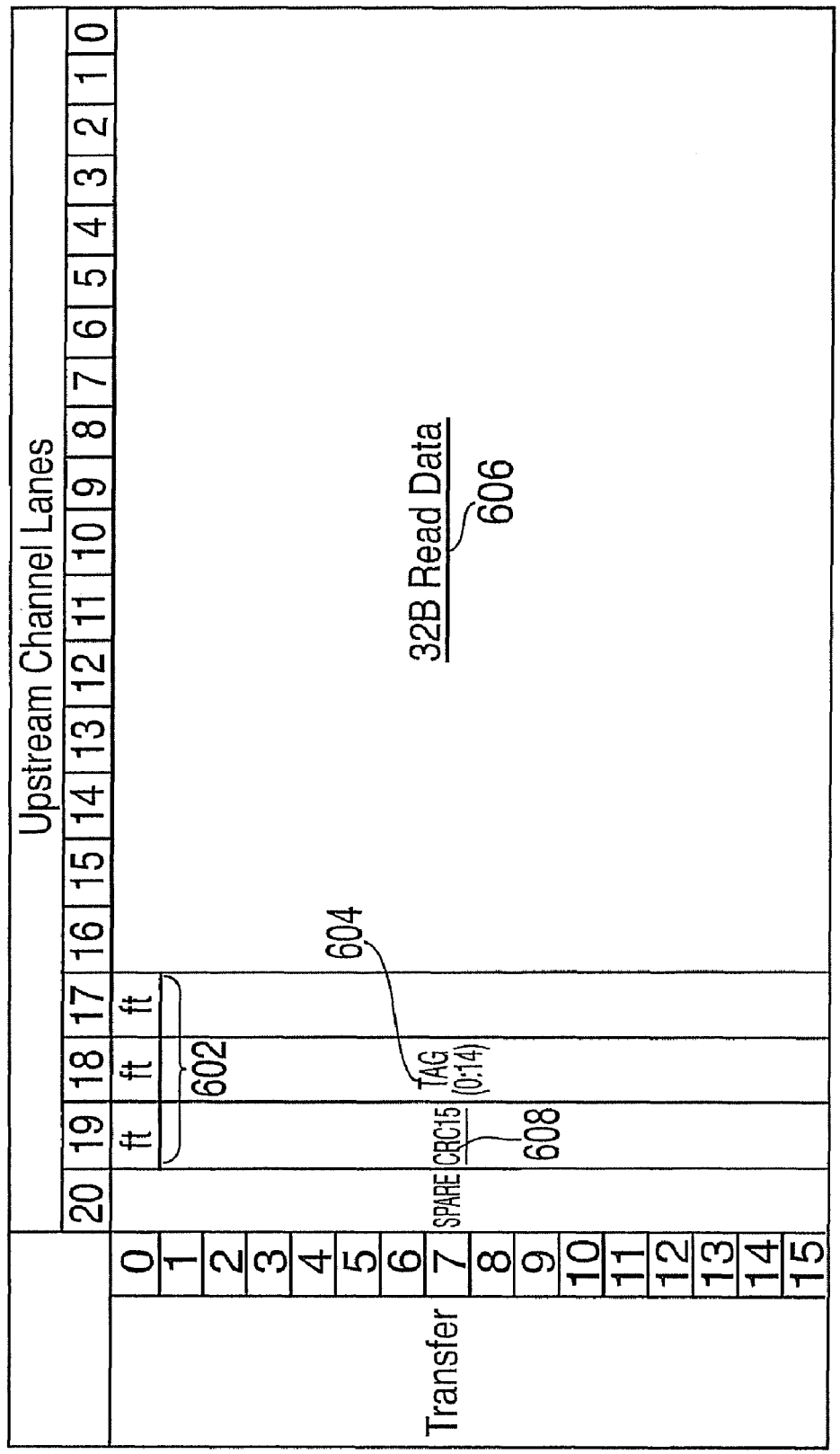
FIG. 6 is a read data format that may be utilized by exemplary embodiments.

In a related exemplary embodiment, both idle transfers and frame start indicators are encoded across multiple bit lanes (e.g. 19, 18 and 17, in FIG. 5). In this embodiment, triple modular redundancy is used to protect the frame start field. In an exemplary embodiment, idle frames are identified by a "0" in the bit lanes 19, 18 and 17, whereas a "1" in the same bitlanes (at the start of a transfer) indicate a valid transfer. Any other responses (e.g. a "0 1 0" pattern) indicate a fault (likely a bus error during an idle period) whereas a "1 0 1" pattern might indicate a bus error during an intended transfer. The latter identification might assist in determining if an error reporting action should be taken. In the latter case, the receiving device might attempt to determine if the transfer is valid, especially if bus fault correction is available (e.g. via bus ECC circuitry). Otherwise, if the means exists for a recipient (e.g. a hub device) to notify upstream devices (e.g., a hub device(s) and/or a memory controller) that a possible transfer was received and found to be in error, then the upstream device could re-send the data and/or other status information. Other exemplary embodiments include a pattern such as a "1 0 1" across multiple bit lanes to denote "idle" sequences, whereas other patterns (e.g., all "1's", all "0's" or "0 1 0" patterns) are used to identify a frame start, with the selected solution based on the bus structure, training mechanism/frequency, fault-detection circuitry, etc. In an exemplary embodiment, all "1's" are used to identify a frame start. Since this embodiment would entail the use of more than a single bit, a new frame format, such as that shown in FIG. 6, would include additional frame start bit positions (bits 17, 18 and 19) and a slight restructuring of the remainder of the frame, as compared to FIG. 5, reducing the bit positions available for the read identification tag 604 by 1. The frame depicted in FIG. 6 also includes read data 606 and bus CRC bits 608. The read data 606 includes 256 bits (32B) of read data, plus additional bits that may be utilized for ECC. In the exemplary embodiment depicted in FIG. 6, transfer 0 lanes 18 and 17 comprise a frame start indicator 602 which is now 3 bits in size, the identification tag 604 is reduced by 1 bit, and the removed data read bit from transfer 0 resides in transfer 1 lane 18, with the frame otherwise unchanged. Other exemplary embodiments may include one or more of the utilization of a two bit frame start field (wherein the read data field 506 in FIG. 5 would be unchanged), while otherwise being consistent with the method described herein.

Figure 7:
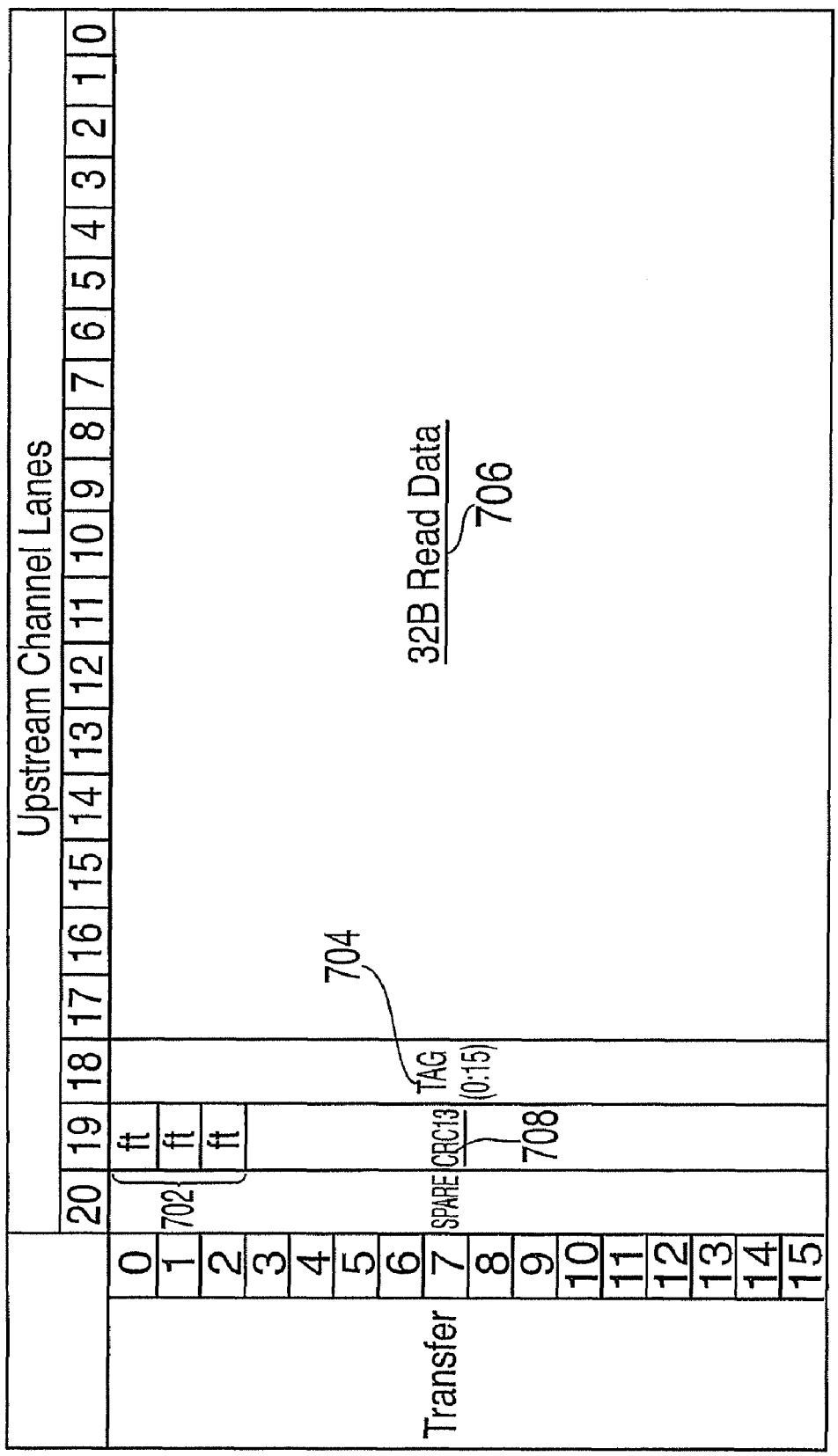
FIG. 7 is a read data format that may be utilized by exemplary embodiments.

In yet another embodiment, as depicted in FIG. 7, the frame start indicator 702 is comprised of multiple transfers on a single bit lane (bit lane "19"). In this case, which is closely related to the single frame start bit indicator method, the first bit (e.g. lane 19 on transfer 0 in FIG. 5) is set to a state opposite that of an "idle" state (e.g. to a "1"), indicating that a frame transfer is being initiated. To confirm that a valid frame is being transferred, however, requires that the remainder of the frame start indicator (e.g. bit lane 19, transfers 1 and 2) contain the remainder of the frame start indicator (e.g. both bits also set to a "1"). If a valid frame is identified (a "1 1 1" pattern, on lane 19, across transfers 0, 1 and 2), then the remainder of the frame is received and tested with the CRC or ECC algorithm. Other frame start indicator patterns may be used, depending on the preferred training pattern or other design attributes. In this embodiment, if the second transfer does not include the expected frame transfer bit polarity, the recipient considers this as a frame error (an erroneously identified frame or a damaged frame), and might then reset the frame capture circuitry to consider the current transfer as possibly indicating the start of a new frame. As such, and depending on the frame start indicator pattern, it is possible for the frame capture circuitry to disregard a single transfer, thereby enabling a subsequent valid transfer to be captured, minimizing lost cycles, expediting recovery from a failed transfer, etc. The frame depicted in FIG. 7 also includes a read identification tag 704, read data 706 and bus CRC bits 708.

Figure 8:
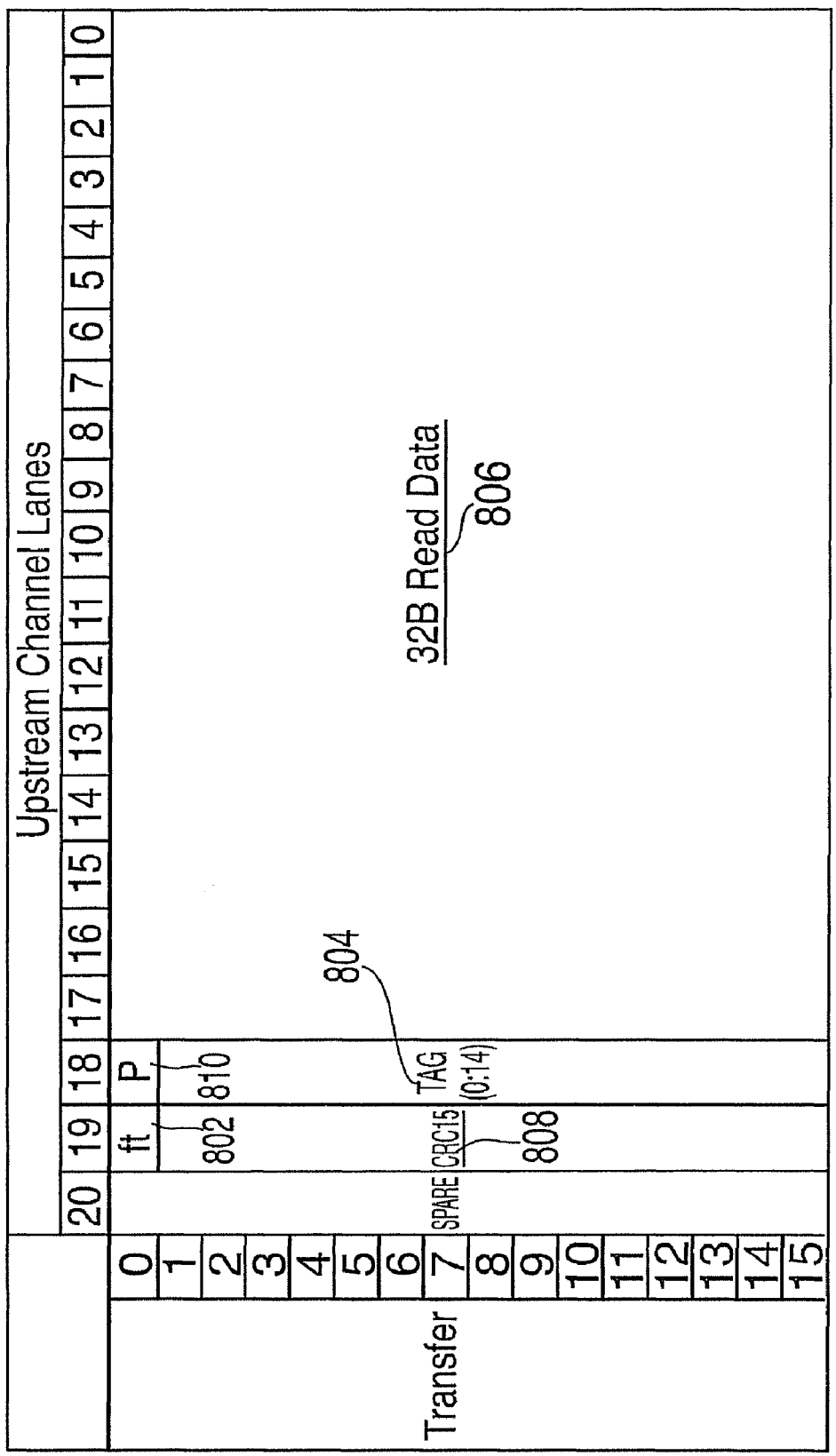
FIG. 8 is a read data format that may be utilized by exemplary embodiments.

Yet further exemplary embodiments, as depicted in FIG. 8, include the use of a parity bit 810 across all or a portion of the bit lanes (and including the bit lane(s) comprising the frame start indicator 802), as a means of identifying failures that may correspond to failed frame start indicator attempts. In this case, the parity bit 810 is encoded across the channel lanes comprising transfer 0, with the parity bit residing in bit lane 18. The frame depicted in FIG. 8 also includes a read identification tag 804, read data 806 and bus CRC bits 808. In an exemplary embodiment, during every idle cycle the recipient checks the parity across the upstream channel lanes to check for valid parity. If no frame transfer bit is detected, but a parity failure is identified, this is a possible indication that a frame transfer was attempted, which would result in an error indication being sent to the attached memory modules. Similarly, if a frame transfer bit is detected, in addition to a parity error, this is a possible indication that the frame transfer bit is in error or that another bit lane is in error. This condition might also result in an error notification to attached memory modules, depending on the system design. Receipt of a frame transfer bit in addition to valid parity across the bit lanes comprising the transfer would indicate the start of a frame with a high degree of confidence. The subsequent CRC and/or ECC testing on the frame would further validate and/or correct the contents of the frame, and training methods would need to be considered in a specific implementation.

Other combinations/extensions of the frame start indication methods described above, and/or modified versions of these methods may be applied in an effort to maximize the ability of a memory system to reliably operate with unpredicted read response times and/or unexpected data transfers, without departing from the scope of the invention.

Figure 9:
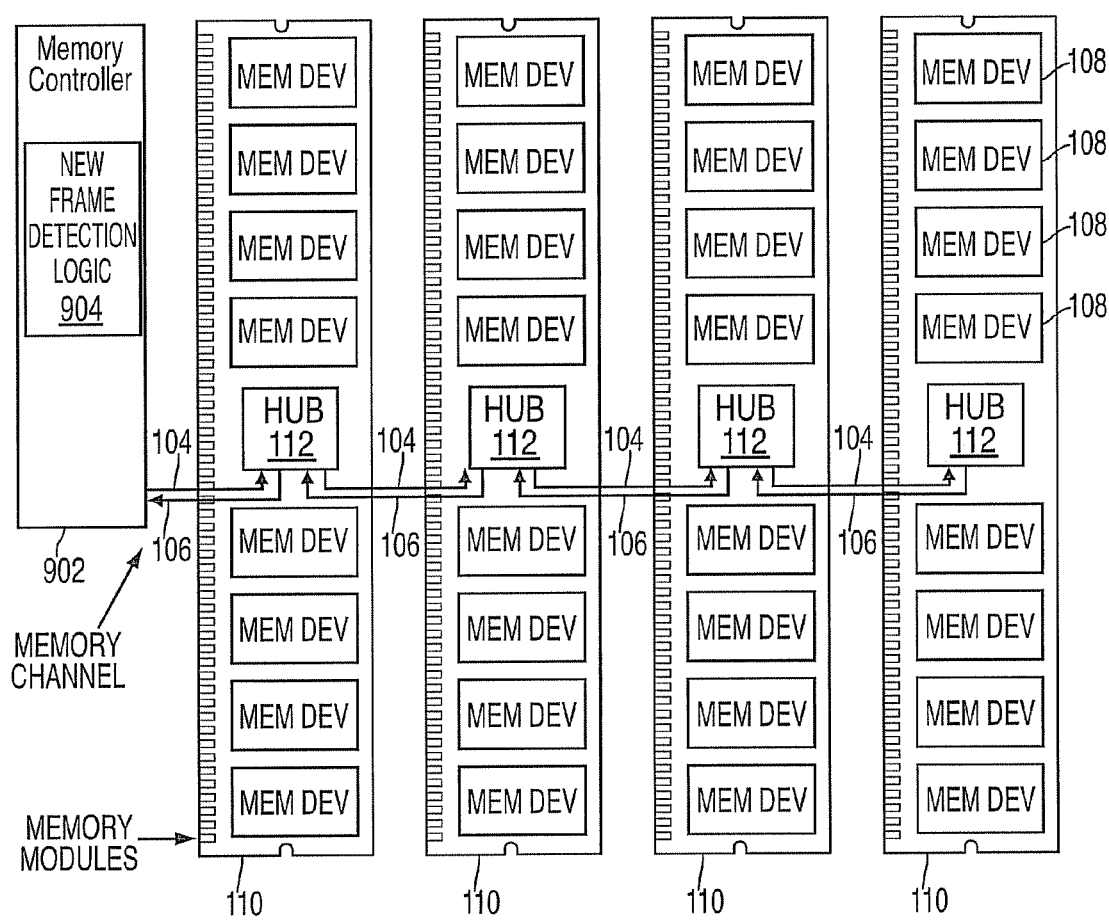
FIG. 9 depicts an exemplary memory system that may be implemented by exemplary embodiments.

FIG. 9 depicts an exemplary memory system that may be implemented by exemplary embodiments. FIG. 9 is similar to FIG. 1 and includes the new frame detection logic in the memory controller 902. This provides the mechanism for the memory controller 902 to determine if a data transfer received via an upstream channel includes a frame start indicator. If the data transfer includes a frame start indicator, then the memory controller captures (e.g., using a mechanism such as circuitry and/or software instructions) the data transfer and "n" subsequent data transfers. In this manner, the memory controller captures a data frame. In an exemplary embodiment, the data frame includes a read data identification tag for associating the data frame with its corresponding read instruction issued by the memory controller. In this manner, the memory controller can support indeterminate data read including both requested and un-requested data frames.

As used herein the term "mechanism" refers to circuitry and/or software instructions for implementing the described process.

Exemplary embodiments include a computing system with a processor(s) and an I/O unit(s) (e.g., requesters) interconnected to a memory system that contains a memory controller and memory devices. In exemplary embodiments, the memory system includes a processor or memory controller interfaced to a set of hub devices (also referred to as "hub chips"). The hub devices connect and interface to the memory devices. In exemplary embodiments the computer memory system includes a physical memory array with a plurality of memory devices for storing data and instructions. These memory devices may be connected directly to the memory controller and/or indirectly coupled to the memory controller through hub devices. In exemplary embodiments, the hub-based computer memory system has memory devices attached to a communication hub device that is connected to a memory control device (e.g., a memory controller). Also in exemplary embodiments, the hub device is located on a memory module (e.g., a single substrate or physical device) that includes two or more hub devices that are cascaded interconnected to each other (and possibly to another hub device located on another memory module) via the memory bus.

Hub devices may be connected to the memory controller through a multi-drop or point-to-point bus structure (which may further include a cascade connection to one or more additional hub devices). Memory access requests are transmitted by the memory controller through the bus structure (e.g., the memory bus) to the selected hub(s). In response to receiving the memory access requests, the hub device translates the memory access requests to control the memory devices to store write data from the hub device or to provide read data to the hub device. Read data is encoded into one or more communication packet(s) and transmitted through the memory bus(ses) to the memory controller.

In alternate exemplary embodiments, the memory controller(s) may be integrated together with one or more processor chips and supporting logic, packaged in a discrete chip (commonly called a "northbridge" chip), included in a multi-chip carrier with the one or more processors and/or supporting logic, or packaged in various alternative forms that best match the application/environment. Any of these solutions may or may not employ one or more narrow/high speed links to connect to one or more hub chips and/or memory devices.

The memory modules may be implemented by a variety of technology including a DIMM, a single in-line memory module (SIMM) and/or other memory module or card structures. In general, a DIMM refers to a small circuit board which is comprised primarily of random access memory (RAM) integrated circuits or die on one or both sides with signal and/or power pins on both sides of the board. This can be contrasted to a SIMM which is a small circuit board or substrate composed primarily of RAM integrated circuits or die on one or both sides and single row of pins along one long edge. The DIMM depicted in FIG. 1 includes 168 pins in the exemplary embodiment, whereas subsequent DIMMs have been constructed with pincounts ranging from 100 pins to over 300 pins. In exemplary embodiments described herein, memory modules may include two or more hub devices.

In exemplary embodiments, the memory bus is constructed using multi-drop connections to hub devices on the memory modules and/or using point-to-point connections. The downstream portion of the controller interface (or memory bus), referred to as the downstream bus, may include command, address, data and other operational, initialization or status information being sent to the hub devices on the memory modules. Each hub device may simply forward the information to the subsequent hub device(s) via bypass circuitry; receive, interpret and re-drive the information if it is determined to be targeting a downstream hub device; re-drive some or all of the information without first interpreting the information to determine the intended recipient; or perform a subset or combination of these options.

The upstream portion of the memory bus, referred to as the upstream bus, returns requested read data and/or error, status or other operational information, and this information may be forwarded to the subsequent hub devices via bypass circuitry; be received, interpreted and re-driven if it is determined to be targeting an upstream hub device and/or memory controller in the processor complex; be re-driven in part or in total without first interpreting the information to determine the intended recipient; or perform a subset or combination of these options.

In alternate exemplary embodiments, the point-to-point bus includes a switch or bypass mechanism which results in the bus information being directed to one of two or more possible hub devices during downstream communication (communication passing from the memory controller to a hub device on a memory module), as well as directing upstream information (communication from a hub device on a memory module to the memory controller), often by way of one or more upstream hub devices. Further embodiments include the use of continuity modules, such as those recognized in the art, which, for example, can be placed between the memory controller and a first populated hub device (i.e., a hub device that is in communication with one or more memory devices), in a cascade interconnect memory system, such that any intermediate hub device positions between the memory controller and the first populated hub device include a means by which information passing between the memory controller and the first populated hub device can be received even if the one or more intermediate hub device position(s) do not include a hub device. The continuity module(s) may be installed in any module position(s), subject to any bus restrictions, including the first position (closest to the main memory controller, the last position (prior to any included termination) or any intermediate position(s). The use of continuity modules may be especially beneficial in a multi-module cascade interconnect bus structure, where an intermediate hub device on a memory module is removed and replaced by a continuity module, such that the system continues to operate after the removal of the intermediate hub device. In more common embodiments, the continuity module(s) would include either interconnect wires to transfer all required signals from the input(s) to the corresponding output(s), or be re-driven through a repeater device. The continuity module(s) might further include a non-volatile storage device (such as an EEPROM), but would not include main memory storage devices.

In exemplary embodiments, the memory system includes one or more hub devices on one or more memory modules connected to the memory controller via a cascade interconnect memory bus, however other memory structures may be implemented such as a point-to-point bus, a multi-drop memory bus or a shared bus. Depending on the signaling methods used, the target operating frequencies, space, power, cost, and other constraints, various alternate bus structures may be considered. A point-to-point bus may provide the optimal performance in systems produced with electrical interconnections, due to the reduced signal degradation that may occur as compared to bus structures having branched signal lines, switch devices, or stubs. However, when used in systems requiring communication with multiple devices or subsystems, this method will often result in significant added component cost and increased system power, and may reduce the potential memory density due to the need for intermediate buffering and/or re-drive.

Although not shown in the Figures, the memory modules or hub devices may also include a separate bus, such as a 'presence detect' bus, an I2C bus and/or an SMBus which is used for one or more purposes including the determination of the hub device an/or memory module attributes (generally after power-up), the reporting of fault or status information to the system, the configuration of the hub device(s) and/or memory subsystem(s) after power-up or during normal operation or other purposes. Depending on the bus characteristics, this bus might also provide a means by which the valid completion of operations could be reported by the hub devices and/or memory module(s) to the memory controller(s), or the identification of failures occurring during the execution of the main memory controller requests.

Performances similar to those obtained from point-to-point bus structures can be obtained by adding switch devices. These and other solutions offer increased memory packaging density at lower power, while retaining many of the characteristics of a point-to-point bus. Multi-drop busses provide an alternate solution, albeit often limited to a lower operating frequency, but at a cost/performance point that may be advantageous for many applications. Optical bus solutions permit significantly increased frequency and bandwidth potential, either in point-to-point or multi-drop applications, but may incur cost and space impacts.

As used herein the term "buffer" or "buffer device" refers to a temporary storage unit (as in a computer), especially one that accepts information at one rate and delivers it another. In exemplary embodiments, a buffer is an electronic device that provides compatibility between two signals (e.g., changing voltage levels or current capability). The term "hub" is sometimes used interchangeably with the term "buffer." A hub is a device containing multiple ports that is connected to several other devices. A port is a portion of an interface that serves a congruent I/O functionality (e.g., a port may be utilized for sending and receiving data, address, and control information over one of the point-to-point links, or busses). A hub may be a central device that connects several systems, subsystems, or networks together. A passive hub may simply forward messages, while an active hub, or repeater, amplifies and refreshes the stream of data which otherwise would deteriorate over a distance. The term hub device, as used herein, refers to a hub chip that includes logic (hardware and/or software) for performing memory functions.

Also as used herein, the term "bus" refers to one of the sets of conductors (e.g., wires, and printed circuit board traces or connections in an integrated circuit) connecting two or more functional units in a computer. The data bus, address bus and control signals, despite their names, constitute a single bus since each are often useless without the others. A bus may include a plurality of signal lines, each signal line having two or more connection points, that form a main transmission path that electrically connects two or more transceivers, transmitters and/or receivers. The term "bus" is contrasted with the term "channel" which is often used to describe the function of a "port" as related to a memory controller in a memory system, and which may include one or more busses or sets of busses. The term "channel" as used herein refers to a port on a memory controller. Note that this term is often used in conjunction with I/O or other peripheral equipment, however the term channel has been adopted by some to describe the interface between a processor or memory controller and one of one or more memory subsystem(s).

Further, as used herein, the term "daisy chain" refers to a bus wiring structure in which, for example, device A is wired to device B, device B is wired to device C, etc. The last device is typically wired to a resistor or terminator. All devices may receive identical signals or, in contrast to a simple bus, each device may modify one or more signals before passing them on. A "cascade" or cascade interconnect' as used herein refers to a succession of stages or units or a collection of interconnected networking devices, typically hubs, in which the hubs operate as a logical repeater, further permitting merging data to be concentrated into the existing data stream. Also as used herein, the term "point-to-point" bus and/or link refers to one or a plurality of signal lines that may each include one or more terminators. In a point-to-point bus and/or link, each signal line has two transceiver connection points, with each transceiver connection point coupled to transmitter circuitry, receiver circuitry or transceiver circuitry. A signal line refers to one or more electrical conductors or optical carriers, generally configured as a single carrier or as two or more carriers, in a twisted, parallel, or concentric arrangement, used to transport at least one logical signal.

Memory devices are generally defined as integrated circuits that are composed primarily of memory (storage) cells, such as DRAMs (Dynamic Random Access Memories), SRAMs (Static Random Access Memories), FeRAMs (Ferro-Electric RAMs), MRAMs (Magnetic Random Access Memories), Flash Memory and other forms of random access and related memories that store information in the form of electrical, optical, magnetic, biological or other means. Dynamic memory device types may include asynchronous memory devices such as FPM DRAMs (Fast Page Mode Dynamic Random Access Memories), EDO (Extended Data Out) DRAMs, BEDO (Burst EDO) DRAMs, SDR (Single Data Rate) Synchronous DRAMs, DDR (Double Data Rate) Synchronous DRAMs or any of the expected follow-on devices such as DDR2, DDR3, DDR4 and related technologies such as Graphics RAMs, Video RAMs, LP RAM (Low Power DRAMs) which are often based on the fundamental functions, features and/or interfaces found on related DRAMs.

Memory devices may be utilized in the form of chips (die) and/or single or multi-chip packages of various types and configurations. In multi-chip packages, the memory devices may be packaged with other device types such as other memory devices, logic chips, analog devices and programmable devices, and may also include passive devices such as resistors, capacitors and inductors. These packages may include an integrated heat sink or other cooling enhancements, which may be further attached to the immediate carrier or another nearby carrier or heat removal system.

Module support devices (such as buffers, hubs, hub logic chips, registers, PLL's, DLL's, non-volatile memory, etc) may be comprised of multiple separate chips and/or components, may be combined as multiple separate chips onto one or more substrates, may be combined onto a single package or even integrated onto a single device—based on technology, power, space, cost and other tradeoffs. In addition, one or more of the various passive devices such as resistors, capacitors may be integrated into the support chip packages, or into the substrate, board or raw card itself, based on technology, power, space, cost and other tradeoffs. These packages may include an integrated heat sink or other cooling enhancements, which may be further attached to the immediate carrier or another nearby carrier or heat removal system.

Memory devices, hubs, buffers, registers, clock devices, passives and other memory support devices and/or components may be attached to the memory subsystem and/or hub device via various methods including solder interconnects, conductive adhesives, socket structures, pressure contacts and other methods which enable communication between the two or more devices via electrical, optical or alternate means.

The one or more memory modules (or memory subsystems) and/or hub devices may be electrically connected to the memory system, processor complex, computer system or other system environment via one or more methods such as soldered interconnects, connectors, pressure contacts, conductive adhesives, optical interconnects and other communication and power delivery methods. Connector systems may include mating connectors (male/female), conductive contacts and/or pins on one carrier mating with a male or female connector, optical connections, pressure contacts (often in conjunction with a retaining mechanism) and/or one or more of various other communication and power delivery methods. The interconnection(s) may be disposed along one or more edges of the memory assembly and/or placed a distance from an edge of the memory subsystem depending on such application requirements as ease-of-upgrade/repair, available space/volume, heat transfer, component size and shape and other related physical, electrical, optical, visual/physical access, etc. Electrical interconnections on a memory module are often referred to as contacts, or pins, or tabs. Electrical interconnections on a connector are often referred to as contacts or pins.

As used herein, the term memory subsystem refers to, but is not limited to: one or more memory devices; one or more memory devices and associated interface and/or timing/control circuitry; and/or one or more memory devices in conjunction with a memory buffer, hub device, and/or switch. The term memory subsystem may also refer to one or more memory devices, in addition to any associated interface and/or timing/control circuitry and/or a memory buffer, hub device or switch, assembled into a substrate, a card, a module or related assembly, which may also include a connector or similar means of electrically attaching the memory subsystem with other circuitry. The memory modules described herein may also be referred to as memory subsystems because they include one or more memory devices and hub devices.

Additional functions that may reside local to the memory subsystem and/or hub device include write and/or read buffers, one or more levels of memory cache, local pre-fetch logic, data encryption/decryption, compression/decompression, protocol translation, command prioritization logic, voltage and/or level translation, error detection and/or correction circuitry, data scrubbing, local power management circuitry and/or reporting, operational and/or status registers, initialization circuitry, performance monitoring and/or control, one or more co-processors, search engine(s) and other functions that may have previously resided in other memory subsystems. By placing a function local to the memory subsystem, added performance may be obtained as related to the specific function, often while making use of unused circuits within the subsystem.

Memory subsystem support device(s) may be directly attached to the same substrate or assembly onto which the memory device(s) are attached, or may be mounted to a separate interposer or substrate also produced using one or more of various plastic, silicon, ceramic or other materials which include electrical, optical or other communication paths to functionally interconnect the support device(s) to the memory device(s) and/or to other elements of the memory or computer system.

Information transfers (e.g. packets) along a bus, channel, link or other naming convention applied to an interconnection method may be completed using one or more of many signaling options. These signaling options may include such methods as single-ended, differential, optical or other approaches, with electrical signaling further including such methods as voltage or current signaling using either single or multi-level approaches. Signals may also be modulated using such methods as time or frequency, non-return to zero, phase shift keying, amplitude modulation and others. Voltage levels are expected to continue to decrease, with 1.5V, 1.2V, 1V and lower signal voltages expected consistent with (but often independent of) the reduced power supply voltages required for the operation of the associated integrated circuits themselves.

One or more clocking methods may be utilized within the memory subsystem and the memory system itself, including global clocking, source-synchronous clocking, encoded clocking or combinations of these and other methods. The clock signaling may be identical to that of the signal lines themselves, or may utilize one of the listed or alternate methods that is more conducive to the planned clock frequency (ies), and the number of clocks planned within the various subsystems. A single clock may be associated with all communication to and from the memory, as well as all clocked functions within the memory subsystem, or multiple clocks may be sourced using one or more methods such as those described earlier. When multiple clocks are used, the functions within the memory subsystem may be associated with a clock that is uniquely sourced to the subsystem, or may be based on a clock that is derived from the clock related to the information being transferred to and from the memory subsystem (such as that associated with an encoded clock). Alternately, a unique clock may be used for the information transferred to the memory subsystem, and a separate clock for information sourced from one (or more) of the memory subsystems. The clocks themselves may operate at the same or frequency multiple of the communication or functional frequency, and may be edge-aligned, center-aligned or placed in an alternate timing position relative to the data, command or address information.

Information passing to the memory subsystem(s) will generally be composed of address, command and data, as well as other signals generally associated with requesting or reporting status or error conditions, resetting the memory, completing memory or logic initialization and other functional, configuration or related information. Information passing from the memory subsystem(s) may include any or all of the information passing to the memory subsystem(s), however generally will not include address and command information. This information may be communicated using communication methods that may be consistent with normal memory device interface specifications (generally parallel in nature), the information may be encoded into a 'packet' structure, which may be consistent with future memory interfaces or simply developed to increase communication bandwidth and/or enable the subsystem to operate independently of the memory technology by converting the received information into the format required by the receiving device(s).

Initialization of the memory subsystem may be completed via one or more methods, based on the available interface busses, the desired initialization speed, available space, cost/complexity objectives, subsystem interconnect structures, the use of alternate processors (such as a service processor) which may be used for this and other purposes, etc. In one embodiment, the high speed bus may be used to complete the initialization of the memory subsystem(s), generally by first completing a training process to establish reliable communication, then by interrogation of the attribute or 'presence detect' data associated the various components and/or characteristics associated with that subsystem, and ultimately by programming the appropriate devices with information associated with the intended operation within that system. In a cascaded system, communication with the first memory subsystem would generally be established, followed by subsequent (downstream) subsystems in the sequence consistent with their position along the cascade interconnect bus.

A second initialization method would include one in which the high speed bus is operated at one frequency during the initialization process, then at a second (and generally higher) frequency during the normal operation. In this embodiment, it may be possible to initiate communication with all of the memory subsystems on the cascade interconnect bus prior to completing the interrogation and/or programming of each subsystem, due to the increased timing margins associated with the lower frequency operation.

A third initialization method might include operation of the cascade interconnect bus at the normal operational frequency (ies), while increasing the number of cycles associated with each address, command and/or data transfer. In one embodiment, a packet containing all or a portion of the address, command and/or data information might be transferred in one clock cycle during normal operation, but the same amount and/or type of information might be transferred over two, three or more cycles during initialization. This initialization process would therefore be using a form of 'slow' commands, rather than 'normal' commands, and this mode might be automatically entered at some point after power-up and/or re-start by each of the subsystems and the memory controller by way of POR (power-on-reset) logic included in each of these subsystems.

A fourth initialization method might utilize a distinct bus, such as a presence detect bus (such as the one defined in U.S. Pat. No. 5,513,135 to Dell et al., of common assignment herewith), an I2C bus (such as defined in published JEDEC standards such as the 168 Pin DIMM family in publication 21-C revision 7R8) and/or the SMBUS, which has been widely utilized and documented in computer systems using such memory modules. This bus might be connected to one or more modules within a memory system in a daisy chain/cascade interconnect, multi-drop or alternate structure, providing an independent means of interrogating memory subsystems, programming each of the one or more memory subsystems to operate within the overall system environment, and adjusting the operational characteristics at other times during the normal system operation based on performance, thermal, configuration or other changes desired or detected in the system environment.

Other methods for initialization can also be used, in conjunction with or independent of those listed. The use of a separate bus, such as described in the fourth embodiment above, also offers the advantage of providing an independent means for both initialization and uses other than initialization, such as described in U.S. Pat. No. 6,381,685 to Dell et al., of common assignment herewith, including changes to the subsystem operational characteristics on-the-fly and for the reporting of and response to operational subsystem information such as utilization, temperature data, failure information or other purposes.

With improvements in lithography, better process controls, the use of materials with lower resistance, increased field sizes and other semiconductor processing improvements, increased device circuit density (often in conjunction with increased die sizes) will help facilitate increased function on integrated devices as well as the integration of functions previously implemented on separate devices. This integration will serve to improve overall performance of the intended function, as well as promote increased storage density, reduced power, reduced space requirements, lower cost and other manufacturer and customer benefits. This integration is a natural evolutionary process, and may result in the need for structural changes to the fundamental building blocks associated with systems.

The integrity of the communication path, the data storage contents and all functional operations associated with each element of a memory system or subsystem can be assured, to a high degree, with the use of one or more fault detection and/or correction methods. Any or all of the various elements may include error detection and/or correction methods such as CRC (Cyclic Redundancy Code), EDC (Error Detection and Correction), parity or other encoding/decoding methods suited for this purpose. Further reliability enhancements may include operation re-try (to overcome intermittent faults such as those associated with the transfer of information), the use of one or more alternate or replacement communication paths to replace failing paths and/or lines, complement-re-complement techniques or alternate methods used in computer, communication and related systems.

The use of bus termination, on busses as simple as point-to-point links or as complex as multi-drop structures, is becoming more common consistent with increased performance demands. A wide variety of termination methods can be identified and/or considered, and include the use of such devices as resistors, capacitors, inductors or any combination thereof, with these devices connected between the signal line and a power supply voltage or ground, a termination voltage or another signal. The termination device(s) may be part of a passive or active termination structure, and may reside in one or mores positions along one or more of the signal lines, and/or as part of the transmitter and/or receiving device(s). The terminator may be selected to match the impedance of the transmission line, or selected via an alternate approach to maximize the useable frequency, operating margins and related attributes within the cost, space, power and other constraints.

Exemplary embodiments pertain to a computer memory system constructed of daisy chained hub logic devices connected to, or contained upon, memory modules. The hubs are daisy chained on a memory controller channel and are further attached to memory devices on the memory modules. The memory controller issues requests for read data to the hubs which merge this read data from the memory modules onto the memory channel. Using channel buffers and packet identification tags, the hubs are able to return read data at a time unpredicted by the memory controller, and at a time that may preempt a read request that had been issued earlier, without loosing or corrupting any of the read data returned on the channel to the memory controller.

Technical effects include the ability to optimize average read data latency by more fully utilizing the upstream channel. Through the use of CCBs, read data frame formats with identification tags and a preemptive data merge technique, indeterminate read data latency may be performed to more fully utilize the controller channel.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A hub device for providing frame start indication, the hub device comprising:
   a mechanism for receiving data transfers via a channel in a memory system and for determining if a data transfer includes a frame start indicator, the memory system having unpredicted read data latency, the channel comprising an upstream channel and a downstream channel, and the receiving on one of the upstream channel and the downstream channel;
   a mechanism for capturing the data transfer and "n" subsequent data transfers in response to determining that the data transfer includes the frame start indicator, the data transfer and the "n" subsequent data transfers comprising a data frame, wherein "n" is greater than zero; and
   a mechanism for transmitting the data frames via the channel, each transmitted data frame including a frame start indicator.

2. The hub device of claim 1 wherein at least one of the transmitted data frames is created at the hub device and the hub device includes a mechanism for adding the frame start indicator to the transmitted data frame.

3. The hub device of claim 1 wherein the data frame includes a read data identification tag for use by a memory controller in associating the data frame with its corresponding read instruction.

4. The hub device of claim 1 wherein the determining includes checking a bit position in the data transfer for a frame start indicator value.

5. The hub device of claim 1 wherein the determining includes checking a plurality of bit positions in the data transfer for a frame start indicator value.

6. The hub device of claim 1 wherein the determining includes checking a bit position in the data transfer and at least one bit position in one or more of the subsequent data transfers for frame start indicator values and capturing the data transfer and "n" subsequent data transfers in response to determining that the data transfer and the one or more subsequent data transfers include the frame start indicator values.

7. The hub device of claim 1 wherein a parity bit in the data transfer is utilized to validate the determining that the data transfer includes a frame start indicator.

8. A method for providing frame start indication, the method comprising:
   receiving a data transfer via a channel in a memory system, the memory system having unpredicted read data latency, the channel configured to transfer data in an upstream direction and a downstream direction;
   determining if the data transfer includes a frame start indicator; and
   capturing the data transfer and "n" subsequent data transfers in response to determining that the data transfer includes a frame start indicator, the data transfer and the "n" subsequent data transfers comprising a data frame, wherein "n" is greater than zero.

* * * * *